(12) United States Patent
Damnjanovic et al.

(10) Patent No.: US 9,491,752 B2
(45) Date of Patent: Nov. 8, 2016

(54) TECHNIQUES FOR ENABLING ASYNCHRONOUS TIME DIVISION DUPLEXING TRANSMISSIONS IN AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Wanshi Chen, San Diego, CA (US); Naga Bhushan, San Diego, CA (US); Peter Gaal, San Diego, CA (US); Kiran Kumar Somasundaram, San Diego, CA (US); Tao Luo, San Diego, CA (US); Yongbin Wei, San Diego, CA (US); Durga Prasad Malladi, San Diego, CA (US); Hao Xu, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 155 days.

(21) Appl. No.: 14/573,075

(22) Filed: Dec. 17, 2014

(65) Prior Publication Data

US 2015/0245327 A1  Aug. 27, 2015

Related U.S. Application Data

(60) Provisional application No. 61/943,760, filed on Feb. 24, 2014.

(51) Int. Cl.
| | |
|---|---|
| *H04L 1/00* | (2006.01) |
| *H04W 72/04* | (2009.01) |
| *H04W 16/14* | (2009.01) |
| *H04W 24/08* | (2009.01) |
| *H04W 72/12* | (2009.01) |

(52) U.S. Cl.
CPC .......... *H04W 72/042* (2013.01); *H04W 16/14* (2013.01); *H04W 24/08* (2013.01); *H04W 72/1215* (2013.01)

(58) Field of Classification Search
CPC ............ H04W 74/00; H04W 74/002; H04W 74/004; H04W 74/006; H04W 74/08; H04L 47/10; H04L 47/11; H04L 47/12; H04L 47/13; H04L 47/14

USPC ......... 370/229, 230, 235, 252, 336
See application file for complete search history.

(56) References Cited

U.S. PATENT DOCUMENTS

| | | | | |
|---|---|---|---|---|
| 2002/0173272 | A1* | 11/2002 | Liang ............... | H04W 72/1215 455/63.1 |
| 2005/0143123 | A1* | 6/2005 | Black ............... | H04W 16/14 455/552.1 |
| 2009/0060001 | A1* | 3/2009 | Waltho ............. | H04B 1/715 375/133 |
| 2011/0158147 | A1* | 6/2011 | Li ..................... | H04W 72/082 370/312 |
| 2012/0030358 | A1* | 2/2012 | MacKenzie ...... | H04W 52/0216 709/226 |
| 2013/0208587 | A1* | 8/2013 | Bala ................. | H04W 16/14 370/230 |

OTHER PUBLICATIONS

IPEA/EPO, Second Written Opinion of the International Preliminary Examining Authority, Int'l App. No. PCT/US2015/016030, Jan. 12, 2016, European Patent Office, Rijswijk, NL, 5 pgs.
ISA/EPO, International Search Report and Written Opinion of the International Searching Authority, Int'l App. No. PCT/US2015/016030, May 19, 2015, European Patent Office, Rijswijk, NL, 9 pgs.

* cited by examiner

*Primary Examiner* — Dady Chery
(74) *Attorney, Agent, or Firm* — Holland & Hart LLP

(57) ABSTRACT

Techniques are described for wireless communication. One method includes monitoring, by a first base station of a first operator, for uplink configuration information and downlink configuration information associated with a second base station of at least one second operator; identifying a transmission timing of one or more uplink transmissions to the second base station of the at least one second operator based at least in part on the uplink configuration information; and prohibiting access to an unlicensed radio frequency spectrum band by the first base station of the first operator during the identified transmission timing of the one or more uplink transmissions. Transmissions of the second base station of the at least one second operator in the unlicensed radio frequency spectrum band may be asynchronous to transmissions of the first base station of the first operator in the unlicensed radio frequency spectrum band.

30 Claims, 14 Drawing Sheets

TECHNIQUES FOR ENABLING ASYNCHRONOUS TIME DIVISION DUPLEXING TRANSMISSIONS IN AN UNLICENSED RADIO FREQUENCY SPECTRUM BAND

CROSS REFERENCES

The present application for patent claims priority to U.S. Provisional Patent Application No. 61/943,760 by Damnjanovic et al., entitled "Techniques For Enabling Asynchronous Time Division Duplexing Transmissions In An Unlicensed Radio Frequency Spectrum Band," filed Feb. 24, 2014, assigned to the assignee hereof, which is hereby incorporated by reference in its entirety.

FIELD OF THE DISCLOSURE

The present disclosure, for example, relates to wireless communication systems, and more particularly to techniques for enabling asynchronous time division duplexing (TDD) transmissions in an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple mobile devices. A base station may communicate with mobile devices on downlink channels (e.g., for transmissions from a base station to a mobile device) and uplink channels (e.g., for transmissions from a mobile device to a base station).

Some modes of communication may enable communications with a mobile device over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, perform a listen before talk (LBT) procedure to gain access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

SUMMARY

The present disclosure, for example, relates to one or more techniques for enabling asynchronous TDD transmissions in an unlicensed radio frequency spectrum band. In some wireless communication systems, the transmissions of a first base station of a first operator may interfere with some transmissions between a second base station of at least one second operator (e.g., a neighboring base station of the first base station of the first operator) and one or more mobile devices served by the second base station of the at least one second operator. For example, in the case of a wireless communication system in which the first base station of the first operator contends for access to an unlicensed radio frequency spectrum band shared with the second base station of the at least one second operator, the first base station of the first operator may repeatedly perform a CCA to determine whether a channel of the unlicensed radio frequency spectrum band is available. When it is determined that the unlicensed radio frequency spectrum band is not available (e.g., because another device is already using the channel of the unlicensed radio frequency spectrum band), a CCA may be performed for the channel again at a later time. However, each unsuccessful CCA performed by the first base station of the first operator has the potential to interfere with transmissions being made over the unlicensed radio frequency spectrum band by another transmitting apparatus (e.g., the second base station of the at least one second operator). Transmissions that may be susceptible to interference are uplink transmissions from a mobile device to the second base station of the at least one second operator (e.g., because the transmit power used for the uplink transmissions may be constrained and/or because the mobile device is distant from the second base station of the at least one second operator). To increase the likelihood that the second base station of the at least one second operator receives the uplink transmissions from the mobile device, the first base station of the first operator may monitor for uplink configuration information and downlink configuration information associated with the second base station of the at least one second operator. Access to the unlicensed radio frequency spectrum band by the first base station of the first operator may then be prohibited during the uplink transmissions based at least in part on the uplink configuration information and/or the downlink configuration information.

In a first set of illustrative examples, a method for wireless communication is described. In one example, the method may include monitoring, by a first base station of a first operator, for uplink configuration information and downlink configuration information associated with a second base station of at least one second operator; identifying a transmission timing of one or more uplink transmissions to the second base station of the at least one second operator based at least in part on the uplink configuration information; and prohibiting access to an unlicensed radio frequency spectrum band by the first base station of the first operator during the identified transmission timing of the one or more uplink transmissions. Transmissions of the second base station of the at least one second operator in the unlicensed radio frequency spectrum band may be asynchronous to transmissions of the first base station of the first operator in the unlicensed radio frequency spectrum band.

In some examples of the method, the monitoring may include monitoring one or more slots of a listen before talk (LBT) frame for the uplink configuration information and the downlink configuration information, and/or detecting a CCA exempt transmission (CET) directly from the second base station of the at least one second operator, wherein the CET comprises the uplink configuration information and the downlink configuration information. In some examples, the CET detected from the second base station of the at least one second operator may include information relating to a paging channel used by the second base station of the at least one second operator. In some examples, the CET detected from the second base station of the at least one second operator may include one or more system information blocks (SIBs). In some examples, the first operator is different from the at least one second operator In some examples, the method may include identifying transmission timings of CETs of the second base station of the at least one second operator. In these examples, the method may include discontinuing transmissions of the first base station of the first operator during the transmission timings of the CETs of the second base station of the at least one second operator. The method may also or alternately include identifying from the CETs of the second base station of the at least one second operator, transmission timings of uplink CETs of a number of mobile devices communicating with the second base station of the at least one second operator, and in some examples may include discontinuing transmissions of the first base station of the first operator during the transmission timings of the uplink CETs of the number of mobile devices communicating with the second base station of the at least one second operator.

In some examples of the method, the monitoring may include receiving a signal including the uplink configuration information and the downlink configuration information when a downlink CCA performed by the second base station of the at least one second operator is successful. By way of example, the signal may include a channel usage beacon signal (CUBS) or may be embedded within a downlink control region of a frame used for wireless communication.

In some examples of the method, the monitoring may include identifying the uplink configuration information and the downlink configuration information based at least in part on one or more uplink grants by the second base station of the at least one second operator. In these examples, the identifying the transmission timing of the one or more uplink transmissions may include dynamically identifying the transmission timing of the or more uplink subframes based at least in part on the uplink configuration information identified from the one or more uplink grants.

In a second set of illustrative examples, an apparatus for wireless communication is described. In one example, the apparatus may include means for monitoring, by a first base station of a first operator, for uplink configuration information and downlink configuration information associated with a second base station of at least one second operator; means for identifying a transmission timing of one or more uplink transmissions to the second base station of the at least one second operator based at least in part on the uplink configuration information; and means for prohibiting access to an unlicensed radio frequency spectrum band by the first base station of the first operator during the identified transmission timing of the one or more uplink transmissions. Transmissions of the second base station of the at least one second operator in the unlicensed radio frequency spectrum band may be asynchronous to transmissions of the first base station of the first operator in the unlicensed radio frequency spectrum band. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to monitor, by a first base station of a first operator, for uplink configuration information and downlink configuration information associated with a second base station of at least one second operator; to identify a transmission timing of one or more uplink transmissions to the second base station of the at least one second operator based at least in part on the uplink configuration information; and to prohibit access to an unlicensed radio frequency spectrum band by the first base station of the first operator during the identified transmission timing of the one or more uplink transmissions. Transmissions of the second base station of the at least one second operator in the unlicensed radio frequency spectrum band may be asynchronous to transmissions of the first base station of the first operator in the unlicensed radio frequency spectrum band. In some examples, the instructions may also be executable by the processor implement one or more aspects of the method for wireless communication described above with respect to the first set of illustrative examples.

In a fourth set of illustrative examples, a non-transitory computer-readable medium storing computer-executable code for wireless communications is described. In one example, the non-transitory computer-readable medium may store computer-executable code by a processor to cause the wireless communication apparatus to monitor, by a first base station of a first operator, for uplink configuration information and downlink configuration information associated with a second base station of at least one second operator; to identify a transmission timing of one or more uplink transmissions to the second base station of the at least one second operator based at least in part on the uplink configuration information; and to prohibit access to an unlicensed radio frequency spectrum band by the first base station of the first operator during the identified transmission timing of the one or more uplink transmissions. Transmissions of the second base station of the at least one second operator in the unlicensed radio frequency spectrum band may be asynchronous to transmissions of the first base station of the first operator in the unlicensed radio frequency spectrum band. In some examples, the instructions may also be executable by the processor to cause the wireless communication apparatus to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
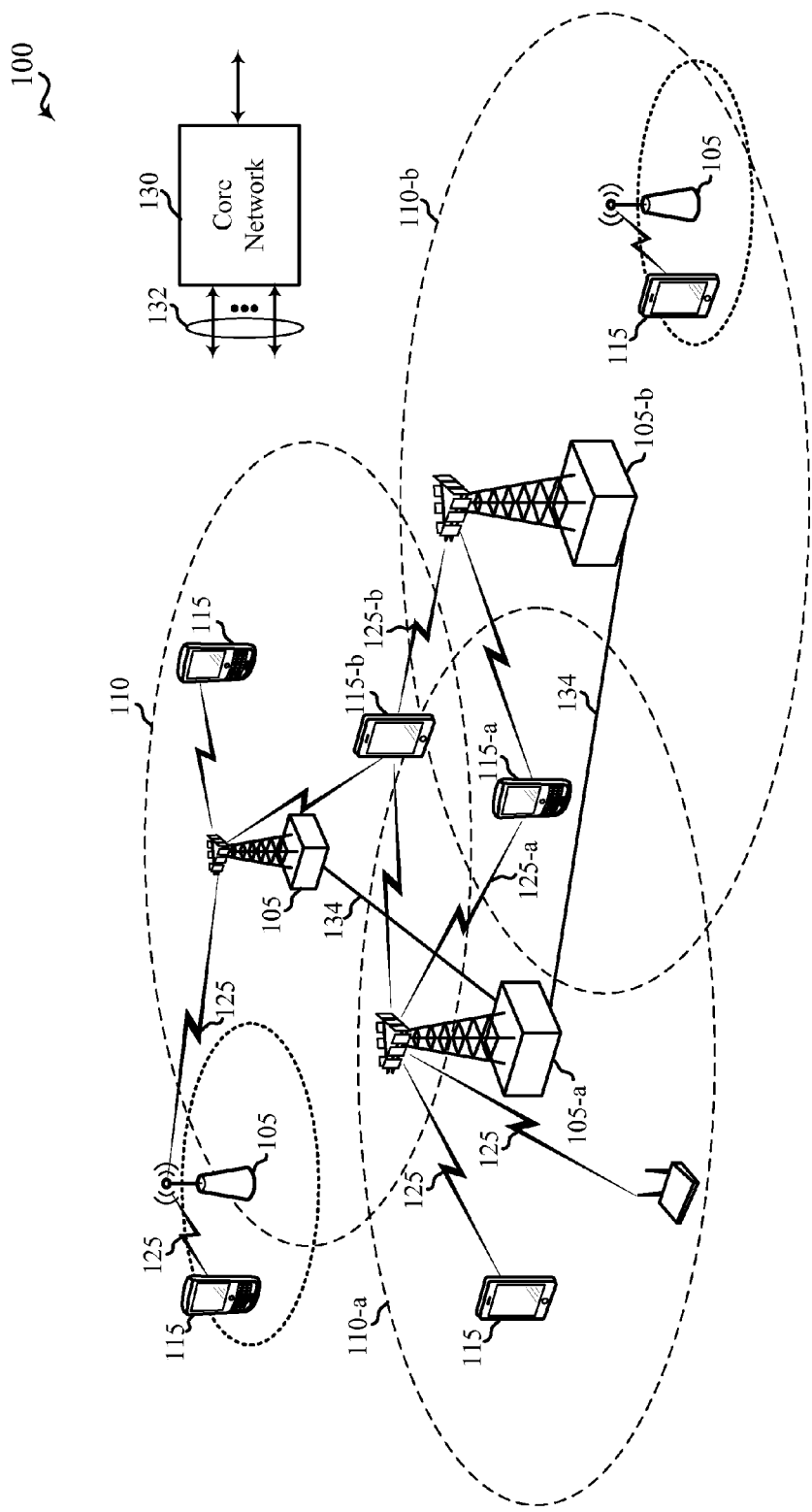
FIG. 1 shows a block diagram of a wireless communication system, in accordance with various aspects of the present disclosure.

Techniques are described in which asynchronous TDD transmissions are enabled in an unlicensed radio frequency spectrum band (e.g., a radio frequency spectrum band for which apparatuses may need to contend for access because the radio frequency spectrum band is available for unlicensed use, such as a Wi-Fi radio frequency spectrum band) used for cellular communications (e.g., Long Term Evolution (LTE) communications and/or LTE-Advanced (LTE-A) communications).

With increasing data traffic in cellular networks, the offloading of at least some data traffic to an unlicensed radio frequency spectrum band may provide a cellular operator (e.g., an operator of a coordinated set of base stations defining a cellular network, such as an LTE/LTE-A network) with opportunities for enhanced data transmission capacity. Prior to gaining access to, and communicating data over, the unlicensed radio frequency spectrum band, a transmitting apparatus may, in some examples, perform an LBT procedure to gain access to the unlicensed radio frequency spectrum band. Such an LBT procedure may include performing a CCA to determine whether a channel of the unlicensed radio frequency spectrum band is available. When it is determined that a channel is not available, a CCA may be performed for the channel again at a later time. However, each unsuccessful CCA performed by the first base station of the first operator has the potential to interfere with transmissions being made over the unlicensed radio frequency spectrum band by another transmitting apparatus. Transmissions that may be more susceptible to interference are uplink transmissions from a mobile device to the second base station of the second operator (e.g., because the transmit power used for the uplink transmissions may be constrained and/or because the mobile device is distant from the second base station of the second operator).

In cases where the transmissions of a second base station of a second operator in an unlicensed radio frequency spectrum band may be asynchronous to transmissions of a first base station of a first operator in the unlicensed radio frequency spectrum band, and in accordance with various aspects of the present disclosure, the likelihood that the second base station of the second operator receives uplink transmissions from mobile devices may be increased when the first base station of the first operator monitors for uplink configuration information and downlink configuration information associated with the second base station of the second operator, and prohibits access to the unlicensed radio frequency spectrum band by the first base station of the first operator during the uplink transmissions. In some examples, prohibiting access to the unlicensed radio frequency spectrum band may include causing the first base station to bypass one or more CCAs for gaining access to an LBT frame of at least one channel of the unlicensed radio frequency spectrum band, which CCAs would have been performed during the uplink transmissions. The at least one channel of the unlicensed radio frequency spectrum band may include at least one channel over which the uplink transmissions to the second base station of the second operator are transmitted.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of mobile devices 115 (e.g., user equipments (UEs)), and a core network 130. Some of the base stations 105 may communicate with the mobile devices 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The mobile devices 115 may be dispersed throughout the wireless communication system 100. A mobile device 115 may also be referred to by those skilled in the art as a user equipment (UE), a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A mobile device 115 may be able to communicate with macro eNBs, pico eNBs, femto eNBs, relays, and the like. A mobile device 115 may also be able to communicate over different types of access networks, such as cellular or other WWAN access networks, or WLAN access networks. In some modes of communication with a mobile device 115, communication may be conducted over a plurality of communication links 125 or channels (i.e., component carriers), with each channel using a component carrier between the mobile device 115 and one of a number of cells (e.g., serving cells, which cells may in some cases be operated by different base stations 105).

Each component carrier may be provided over a licensed radio frequency spectrum band or an unlicensed radio frequency spectrum band, and a set of component carriers used in a particular mode of communication may all be received (e.g., at a mobile device 115) over a licensed radio frequency spectrum band, all be received (e.g., at a mobile device 115) over an unlicensed radio frequency spectrum band, or be received (e.g., at a mobile device 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a mobile device 115 to a base station 105) and/or downlink channels (using component carriers) for carrying downlink (DL) communications (e.g., transmissions from a base station 105 to a mobile device 115). The UL communications or transmissions may also be called reverse link communications or transmissions, while the DL communications or transmissions may also be called forward link communications or transmissions. The downlink communications and/or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and/or a standalone mode in which LTE/LTE-A downlink and uplink communications between a base station and a mobile device may take place in an unlicensed radio frequency spectrum band. Base stations 105 as well as mobile devices 115 may in some examples support one or more of these or similar modes of operation. OFDMA waveforms may be used in the communication links 125 for LTE/LTE-A downlink communications in a licensed radio frequency spectrum band and/or an unlicensed radio frequency spectrum band, while OFDMA, SC-FDMA and/or resource block interleaved FDMA waveforms may be used in the communication links 125 for LTE/LTE-A uplink communications in a licensed radio frequency spectrum band and/or an unlicensed radio frequency spectrum band.

In some examples of the wireless communication system 100, an apparatus seeking to transmit using an unlicensed radio frequency spectrum band may be required to verify that the unlicensed radio frequency spectrum band is available for use in such a transmission, that is, the unlicensed radio frequency spectrum band is not already in use by one or more other apparatuses. Thus, prior to transmitting using the unlicensed radio frequency spectrum band, an apparatus may perform a contention-based channel access procedure, also referred to as an LBT procedure, in order to gain channel access. For example, a CCA may be used to determine availability of the unlicensed radio frequency spectrum band. Performance of a CCA may involve checking that the unlicensed radio frequency spectrum band is not otherwise occupied prior to initiating transmissions.

In some cases, fair access to an unlicensed radio frequency spectrum band may be facilitated by the coordination of CCAs performed by different apparatuses or nodes of different operators that want to access the unlicensed radio frequency spectrum band. In some of the CCA coordination methods, CCAs may be coordinated to occur in predetermined time periods amongst multiple apparatuses or nodes that may desire to access the unlicensed radio frequency spectrum band. For example, a time period may be identified during which multiple coordinated nodes may perform CCA for downlink channel access in an unlicensed radio frequency spectrum band. To facilitate fair access to the unlicensed radio frequency spectrum band, different operators may be given different CCA priorities in different CCA time periods. Such coordination results in a synchronous system in which apparatuses or nodes seek access, and transmit radio frequency signals, in a synchronized and fair manner.

While such time-synchronization may be ensured within a single operator deployment, it may or may not be ensured between different operators deploying service on the same channel of an unlicensed radio frequency spectrum band. The base stations of different operators may therefore operate asynchronously. More specifically, if a first set of coordinated base stations performs a CCA earlier in an LBT frame than other sets of coordinated base stations, the first set of coordinated base stations may be transmitting during a relatively large number of consecutive LBT frames, resulting in multiple consecutive unsuccessful contentions for access to the unlicensed radio frequency spectrum band by the other sets of coordinated base stations. Accordingly, when access to the unlicensed radio frequency spectrum band is won by a base station of an operator for one or more LBT frames, a determination may be made as to whether the number of LBT frames for which access to the unlicensed radio frequency spectrum band has been won is equal to or greater than a threshold number of consecutive LBT frames (e.g., N consecutive LBT frames). If the number of LBT frames for which access to the unlicensed radio frequency spectrum band has been won is equal to or greater than the threshold number of consecutive LBT frames, access to the unlicensed radio frequency spectrum band may be relinquished for a period of time (e.g., K LBT frames), in order to allow base stations of other operators to access the unlicensed radio frequency spectrum band. The protocol by which a base station may access a channel of the unlicensed radio frequency spectrum band for N LBT frames, but is then required to relinquish access to the channel of the unlicensed radio frequency spectrum band for K LBT frames may be referred to as an N/K protocol. Relinquishment of the unlicensed radio frequency spectrum band may be accomplished by, for example, stopping contention procedures and/or transmissions/receptions on the unlicensed radio frequency spectrum band for the period of time.

In cases where the base stations of different operators have asynchronous timings, fair access to an unlicensed radio frequency spectrum band may also or alternately be facilitated by protecting at least some asynchronous transmissions (e.g., asynchronous CETs) in the unlicensed radio frequency spectrum band. In some wireless communication systems, the asynchronous transmissions of a first base station of a first operator and a second base station of a second operator may interfere with one another. In the case of some transmissions, such as CETs containing discovery signals, system information, and/or configuration information, a mobile device's failure to receive the transmissions may prevent the mobile device from receiving and/or transmitting data over an associated channel of the unlicensed radio frequency spectrum band. Similarly, communication between a base station and the mobile devices it serves may be hindered when the base station fails to receive uplink CETs from the mobile devices. To increase the likelihood that mobile devices receive CETs transmitted by their serving base station, and that the serving base station receives uplink CETs from the mobile devices it serves, the first base station of the first operator may discontinue transmissions during transmission timings of at least some transmissions (e.g., CETs) of the second base station of the second operator and/or the mobile devices served by the second base station of the second operator. Similarly, the second base station of the second operator may discontinue transmissions during transmission timings of at least some transmissions (e.g., CETs) of the first base station of the first operator and/or the mobile devices served by the first base station of the first operator.

In one aspect, FIG. 1 illustrates an example of neighboring base stations 105-*a* and 105-*b* and associated mobile devices 115-*a* and 115-*b*. A first base station 105-*a* and a second base station 105-*b* may have overlapping coverage areas, such as a first coverage area 110-*a* and a second coverage area 110-*b*, respectively. In this example, the first base station 105-*a* may communicate with a first mobile device 115-*a* using a first communication link 125-*a* in an unlicensed radio frequency spectrum band. Similarly, the second base station 105-*b* may communicate with a second mobile device 115-*b* using a second communication link 125-*b* in the unlicensed radio frequency spectrum band. According to some deployments, the first base station 105-*a* and the first mobile device 115-*a* may be deployed in a first operator's network and may be coordinated and contend for the unlicensed radio frequency spectrum band independently on each synchronous frame during a contention period that is coordinated among the base stations 105 of the first operator. Further, in some deployments, the second base station 105-*b* and the second mobile device 115-*b* may be deployed in a second operator's network and may be coordinated and contend for the unlicensed radio frequency spectrum band independently on each synchronous frame during a contention period that is coordinated among the base stations 105 of the second operator. As mentioned above, in examples where the first base station 105-*a* and first mobile device 115-*a* and second base station 105-*b* and second mobile device 115-*b* are not synchronized, and in the absence of an N/K protocol for regulating access to the unlicensed radio frequency spectrum band, one of the operators may be precluded from accessing the unlicensed radio frequency spectrum band for a relatively long period of time when the coordinated contention periods are asynchronous. As is well understood, other users may also transmit signals in the unlicensed radio frequency spectrum band, including, for example, a Wi-Fi access point. A Wi-Fi access point may transmit Wi-Fi signals in the unlicensed radio frequency spectrum band.

As mentioned above, a Wi-Fi access point may communicate asynchronously with one or more other devices and may not have priority over any other devices seeking access to the unlicensed radio frequency spectrum band. Accordingly, a Wi-Fi access point may gain channel access to the unlicensed radio frequency spectrum band through standard LBT procedures used to access an unlicensed radio frequency spectrum band. In the event that the Wi-Fi access point is already transmitting during a CCA procedure of one or both of first base station 105-*a* and/or second base station 105-*b*, the Wi-Fi access point would retain access to the unlicensed radio frequency spectrum band, and the first base station 105-*a* and the second base station 105-*b* would not transmit using the unlicensed radio frequency spectrum band until performing a successful CCA procedure.

When the second mobile device 115-*b* wins contention to access the unlicensed radio frequency spectrum band and is making uplink transmissions to the second base station 105-*b*, the uplink transmissions may be susceptible to interference due to the transmit power of the second mobile device 115-*b* and/or other factors. To increase the likelihood that the second base station 105-*b* receives the uplink transmissions from the second mobile device 115-*b*, the first base station 105-*a* (of a different operator than the second base station 105-*b*) may monitor for uplink configuration information and downlink configuration information associated with the second base station 105-*b*. Access to the unlicensed radio frequency spectrum band by the first base station 105-*a* may then be prohibited during the uplink transmissions from the second mobile device 115-*b* to the second base station 105-*b* based at least in part on the uplink configuration information and/or the downlink configuration information.

Figure 2:
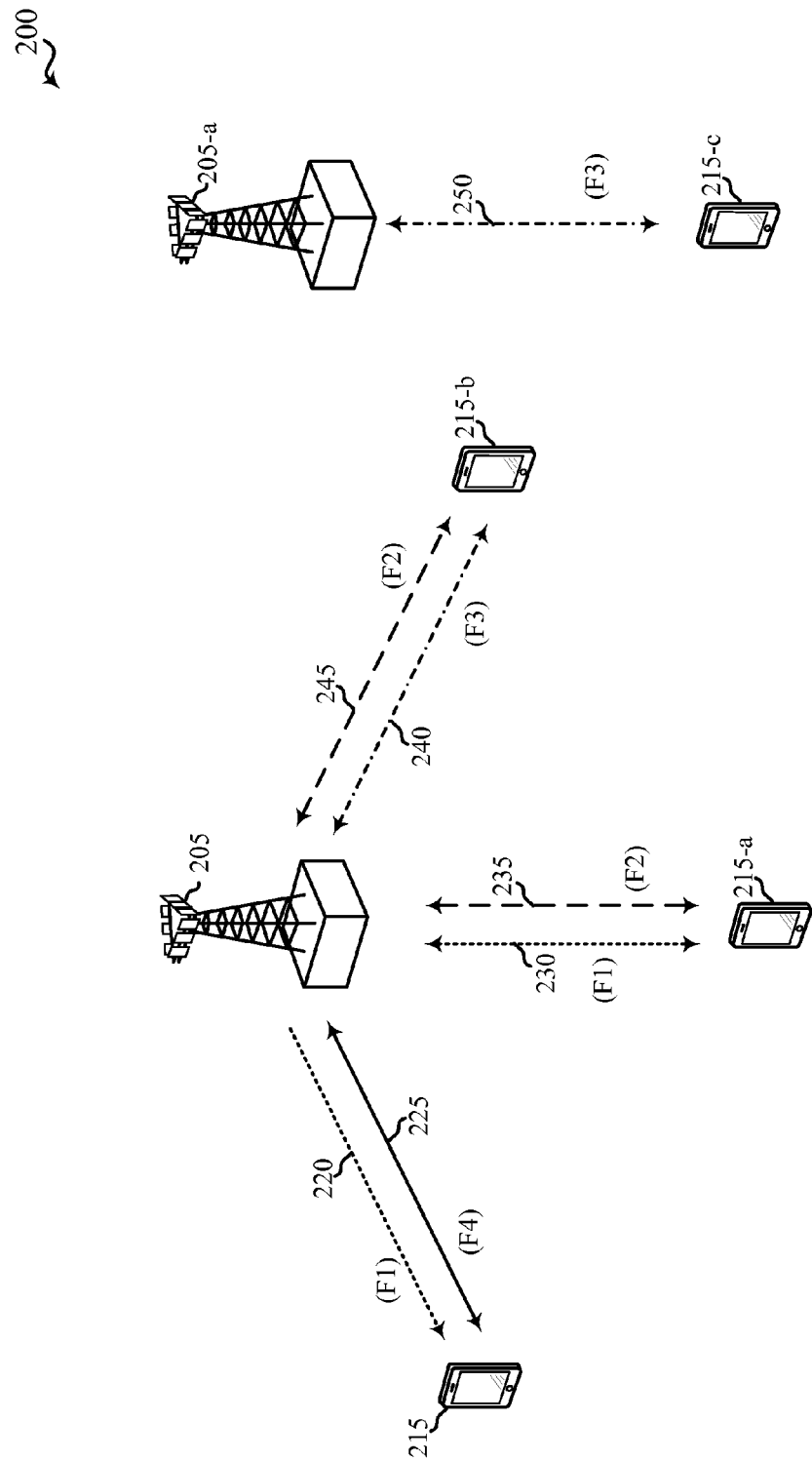
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first mobile device 215, a second mobile device 215-*a*, a third mobile device 215-*b*, and a fourth mobile device 215-*c* may be examples of aspects of one or more of the mobile devices 115 described with reference to FIG. 1.

In the example of a supplemental downlink mode in the wireless communication system 200, the first base station 205 may transmit OFDMA waveforms to the first mobile device 215 using a downlink channel 220. The downlink channel 220 may be associated with a frequency F1 in an unlicensed radio frequency spectrum band. The first base station 205 may transmit OFDMA waveforms to the first mobile device 215 using a first bidirectional link 225 and may receive SC-FDMA waveforms from the first mobile device 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one mobile device) or for multicast services (e.g., addressed to several mobile devices). This scenario may occur with any service provider (e.g., an MNO) that uses a licensed radio frequency spectrum and needs to relieve some of the traffic and/or signaling congestion.

In one example of a carrier aggregation mode in the wireless communication system 200, the first base station 205 may transmit OFDMA waveforms to the second mobile device 215-a using a second bidirectional link 230 and may receive OFDMA waveforms, SC-FDMA waveforms, and/or resource block interleaved FDMA waveforms from the second mobile device 215-a using the second bidirectional link 230. The second bidirectional link 230 may be associated with the frequency F1 in the unlicensed radio frequency spectrum band. The first base station 205 may also transmit OFDMA waveforms to the second mobile device 215-a using a third bidirectional link 235 and may receive SC-FDMA waveforms from the second mobile device 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third mobile device 215-b using a fourth bidirectional link 240 and may receive OFDMA waveforms, SC-FDMA waveforms, and/or resource block interleaved waveforms from the third mobile device 215-b using the fourth bidirectional link 240. The fourth bidirectional link 240 may be associated with a frequency F3 in the unlicensed radio frequency spectrum band. The first base station 205 may also transmit OFDMA waveforms to the third mobile device 215-b using a fifth bidirectional link 245 and may receive SC-FDMA waveforms from the third mobile device 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using shared access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth mobile device 215-c using a bidirectional link 250 and may receive OFDMA waveforms, SC-FDMA waveforms, and/or resource block interleaved FDMA waveforms from the fourth mobile device 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105 and/or 205 described with reference to FIGS. 1 and/or 2 may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a CCA. The outcome of the CCA may indicate to the transmitting device whether a channel of an unlicensed radio frequency spectrum band is available or in use for the gating interval (also referred to as an LBT frame). When a CCA indicates that the channel is available (e.g., "clear" for use) for a corresponding LBT frame, the transmitting apparatus may reserve and/or use the channel of the unlicensed radio frequency spectrum band during part or all of the LBT frame. When the CCA indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in an unlicensed radio frequency spectrum band, and to synchronize at least one boundary of the periodic gating interval with at least one boundary of a periodic frame structure (e.g., a periodic LTE/LTE-A radio frame structure) associated with the cellular downlink. Examples of such synchronization are shown in FIG. 3.

Figure 3:
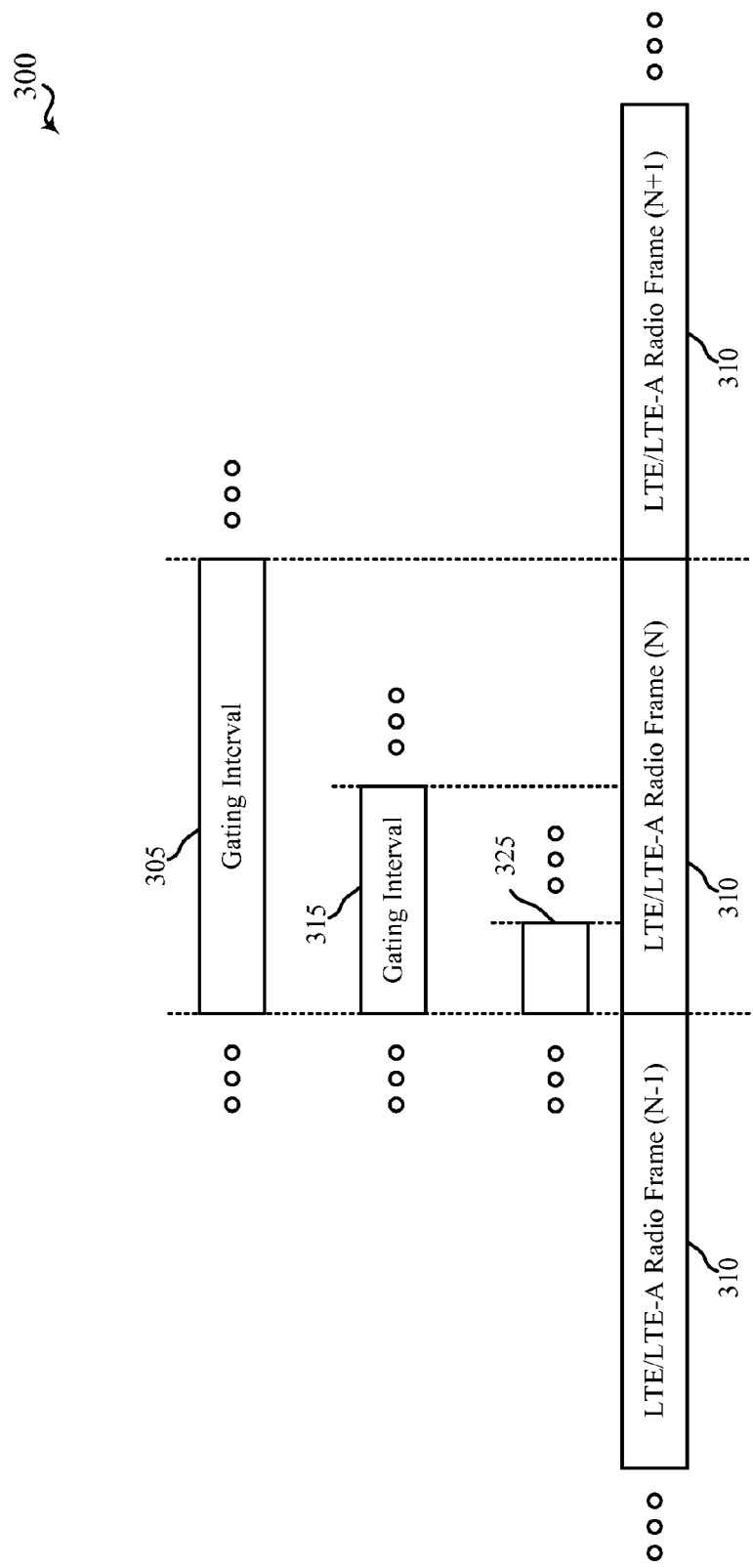
FIG. 3 shows examples of a gating interval (or LBT frame) for a cellular downlink in an unlicensed radio frequency spectrum band, in accordance with various aspects of the present disclosure.

FIG. 3 shows examples 300 of a gating interval (or LBT frame) for a cellular downlink in an unlicensed radio frequency spectrum band, in accordance with various aspects of the present disclosure. The first gating interval 305, the second gating interval 315, and/or the third gating interval 325 may be used as a periodic gating interval by an eNB that supports transmissions over the unlicensed radio frequency spectrum band. Examples of such an eNB may include the base stations 105 and/or 205 described with reference to FIGS. 1 and/or 2. The first gating interval 305, the second gating interval 315, and/or the third gating interval 325 may be used with the wireless communication system 100 and/or 200 described with reference to FIGS. 1 and/or 2.

By way of example, the duration of a first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of a second gating interval 315 and a third gating interval 325 are shown to be sub-multiples of (or approximate sub-multiples of) the duration of the periodic frame structure associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-tenth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration, which may facilitate more frequent sharing of an unlicensed radio frequency spectrum band according to the N/K protocol discussed herein.

In the case of the second gating interval 315 or LBT frame having a five millisecond duration, and by way of example, the second gating interval 315 may have a TDD configuration. In such examples, the second gating interval 315 may include one or more OFDM symbols for performing a downlink CCA (DCCA), and/or one or more OFDM symbols for performing an uplink CCA (UCCA). The provision and timing of the one or more OFDM symbols for performing the downlink CCA and/or the uplink CCA may vary depending on the TDD configuration (e.g., downlink/uplink configuration) of a gating interval. The second gating interval 315 may in some cases correspond to a downlink only TDD configuration, an uplink only TDD configuration, or a mixed downlink/uplink TDD configuration. The downlink/uplink configuration of the second gating interval 315 or LBT frame may be signaled in a downlink control region (e.g., of a first downlink (D) subframe) of the gating interval (when provided). Following the provision of one or more OFDM symbols for performing a downlink CCA or an uplink CCA, the second gating interval 315 or LBT frame may provide one or more OFDM symbols for transmitting a channel usage beacon signal (CUBS). The CUBS may include uplink configuration information and downlink configuration information for the second gating interval 315 or LBT frame.

In a supplemental downlink mode of operation using an unlicensed radio frequency spectrum band, and in some examples, a base station may employ a five millisecond second gating interval 315 having five downlink subframes, with the last of the five subframes being a special subframe. The special subframe may have a portion reserved for performing a CCA procedure. In a TDD mode of operation using an unlicensed radio frequency spectrum band, and in some examples, a base station may employ a five millisecond second gating interval 315 having a dynamically selected configuration of uplink subframes and downlink subframes, such as set of frames including a downlink subframe, a special subframe for performing an uplink CCA, and three uplink subframes.

In the case of the third gating interval 325 or LBT frame having a two millisecond duration, and by way of example, the third gating interval 325 or LBT frame may in some examples have a TDD configuration. In such examples, the third gating interval 325 may include one or more OFDM symbols for performing a downlink CCA (DCCA), and/or one or more OFDM symbols for performing an uplink CCA (UCCA). The provision and timing of the one or more OFDM symbols for performing the downlink CCA and/or the uplink CCA may vary depending on the TDD configuration (e.g., downlink/uplink configuration) of a particular gating interval. The third gating interval 325 may in some cases correspond to a downlink only TDD configuration, an uplink only TDD configuration, or a mixed downlink/uplink TDD configuration. Because of the third gating interval's short duration, a downlink only TDD configuration or uplink only TDD configuration may reduce overhead. The downlink/uplink configuration of the third gating interval 325 or LBT frame may be signaled in a downlink control region (e.g., of a first downlink (D) subframe) of the gating interval (when provided). Following the provision of one or more OFDM symbols for performing a downlink CCA or an uplink CCA, the third gating interval 325 or LBT frame may provide one or more OFDM symbols for transmitting a channel usage beacon signal (CUBS). The CUBS may include uplink configuration information and downlink configuration information for the third gating interval 325 or LBT frame.

A two millisecond third gating interval 325 may be useful in that it may further reduce the overhead to protect CETs of other operators. A two millisecond third gating interval 325 may also minimize the delay to access an unlicensed radio frequency spectrum band. In a TDD mode of operation using an unlicensed radio frequency spectrum band, and in some examples, each of a number of two millisecond third gating intervals 315 may correspond to an uplink LBT frame or a downlink LBT frame.

At the beginning of a gating interval or LBT frame (e.g., at the beginning of the first gating interval 305, the second gating interval 315, or the third gating interval 325), or at the end of a prior gating interval or LBT frame, a CCA may be performed by each of a number of base stations that are synchronized with the gating interval and desire to contend for access to the LBT frame. Upon winning access to the LBT frame, a base station may transmit a CUBS to reserve access to the LBT frame and/or to enable one or more mobile devices to synchronize to the LBT frame. When the base stations of an operator are operated synchronously, but the base stations of different operators are operated asynchronously, the CUBS may have a fixed duration, because access to an unlicensed radio frequency spectrum band shared by different operators is governed by an asynchronous operation protocol (e.g., an N/K protocol) and not the detection of the CUBS.

In the case of asynchronous operators, in which transmissions of a first base station of a first operator are asynchronous to transmissions of a second base station of a second operator, the sharing of an unlicensed radio frequency spectrum band may be facilitated by use of an N/K protocol, in which a base station that successfully performs CCA for N consecutive LBT frames does not participate in an LBT procedure over the next K LBT frames. In this manner, for example, the second base station of the second operator may be provided with an opportunity to gain access to a channel of the unlicensed radio frequency spectrum band despite there being no procedure to synchronously change the temporal order in which the CCAs of the first operator and the second operator are performed (i.e., the CCA timing of the first operator and the second operator) from one LBT frame to a next LBT frame. Values of N may be, for example, 2, 3, 4, or 5 LBT frames, and values of K may be, for example, 0 or 1 LBT frame. The duration of an LBT frame may be, for example, ten, five, or two milliseconds, as represented, respectively, by the first gating interval 305, the second gating interval 315, and the third gating interval 325. A ten millisecond first gating interval 305 or LBT frame corresponds to the duration of the LTE/LTE-A radio frame 310.

Figure 4:
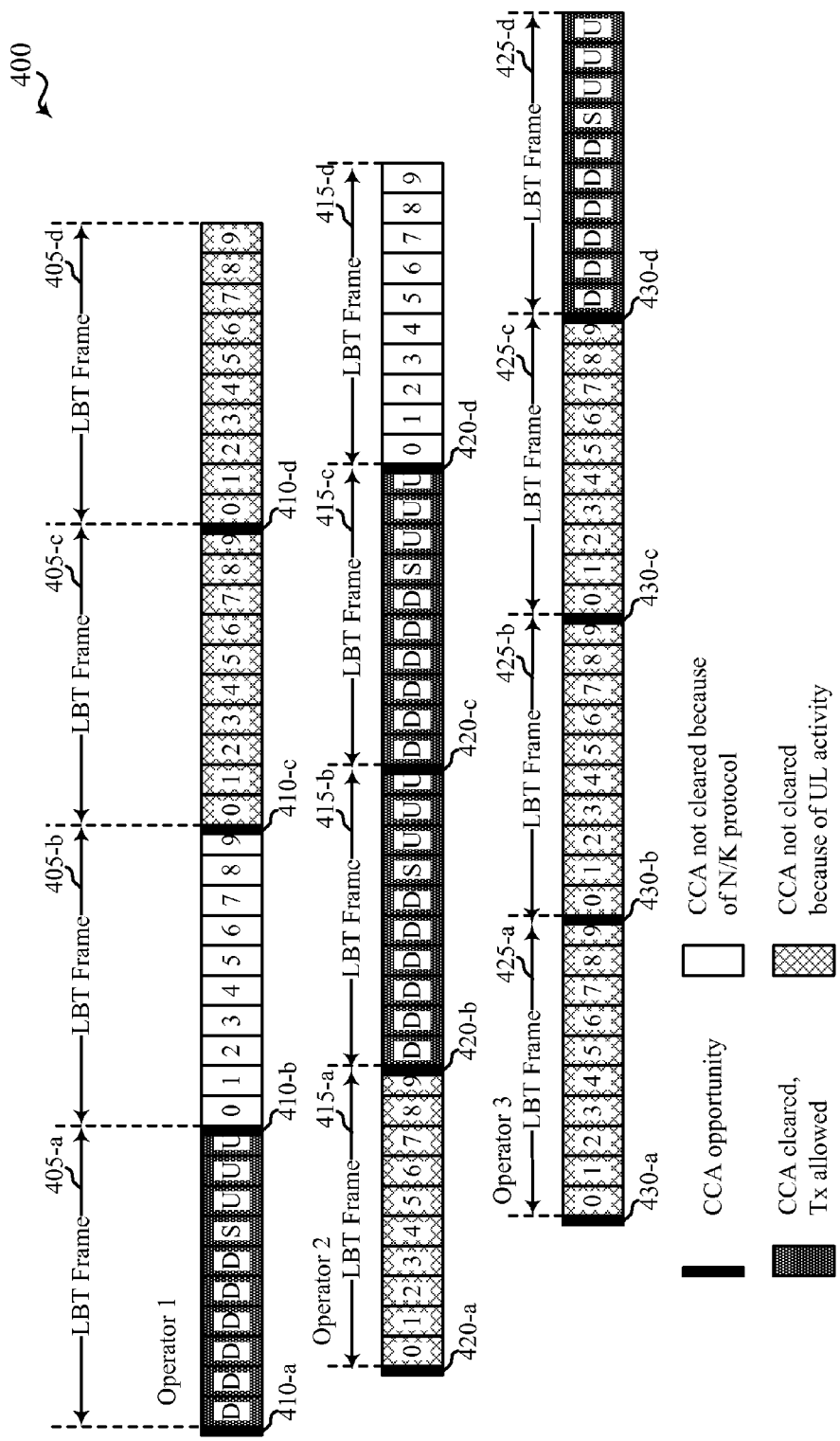
FIG. 4 shows an example of how a first base station of a first operator (e.g., Operator 1) may protect the uplink transmissions of a second base station of a second operator (e.g., Operator 2), in accordance with various aspects of the present disclosure.

FIG. 4 shows an example 400 of how a first base station of a first operator (e.g., Operator 1) may protect the uplink transmissions of a second base station of a second operator (e.g., Operator 2), in accordance with various aspects of the present disclosure. More particularly, FIG. 4 shows example transmissions over an unlicensed radio frequency spectrum band, of three base stations of three respective asynchronous operators (e.g., Operator 1, Operator 2, and Operator 3). As shown, Operator 1 may gain access to the unlicensed radio frequency spectrum band during a first LBT frame 405-a after performing a first CCA 410-a. Assuming an N/K protocol is in effect, and that Operator 1 has satisfied its threshold of N LBT frames with its use of the first LBT frame 405-a, Operator 1 may forego performing a second CCA 410-b and not transmit over the unlicensed radio frequency spectrum band during a second LBT frame 405-b. At a next CCA opportunity, Operator 1 is authorized by the N/K protocol to perform a third CCA 410-c to contend for access to a third LBT frame 405-c. However, because Operator 1 has identified the transmission timing of one or more uplink subframes used for uplink transmissions to a second base station of Operator 2, Operator 1 may be prohibited from performing the third CCA 410-c, and may not access the unlicensed radio frequency spectrum band during the third LBT frame 405-c. This may increase the likelihood that the second base station of Operator 2 receives the one or more uplink transmissions during the one or more uplink subframes. At a further CCA opportunity, Operator 1 is authorized by the N/K protocol to perform a fourth CCA 410-d to contend for access to the unlicensed radio frequency spectrum band during a fourth LBT frame 405-d. However, because Operator 1 has identified the transmission timing of an additional one or more uplink subframes used for uplink transmissions to the second base station of Operator 2, Operator 1 may be prohibited from performing the fourth CCA 410-d, and may not access the unlicensed radio frequency spectrum band during the fourth LBT frame 405-d. This may increase the likelihood that the second base station of Operator 2 receives the additional one or more uplink subframes.

Operator 2 may perform a fifth CCA 420-a to gain access to an unlicensed radio frequency spectrum band during a fifth LBT frame 415-a. However, because Operator 1 is already using the unlicensed radio frequency spectrum band, the fifth CCA 420-a will fail and Operator 2 may not transmit over the unlicensed radio frequency spectrum band during the fifth LBT frame 415-a. At a next CCA opportunity, Operator 2 may perform a sixth CCA 420-b to gain access to a sixth LBT frame 415-b. Because the unlicensed radio frequency spectrum band is not in use, Operator 2 may win contention and access the unlicensed radio frequency spectrum band during the sixth LBT frame 415-b. Operator 2 may similarly perform a seventh CCA 420-c to gain access to a seventh LBT frame 415-c, and because no other operator is using or contending for the unlicensed radio frequency spectrum band, Operator 2 may win contention and access the unlicensed radio frequency spectrum band during the seventh LBT frame 415-c. However, assuming that N=2 in the N/K protocol, Operator 2 may forego performing an eighth CCA 420-d and not transmit over the unlicensed radio frequency spectrum band during an eighth LBT frame 415-d.

Operator 3 may perform a ninth CCA 430-a to gain access to an unlicensed radio frequency spectrum band during a ninth LBT frame 425-a. However, because Operator 1 is already using the unlicensed radio frequency spectrum band, the ninth CCA 430-a will fail and Operator 3 may not win contention to access the unlicensed radio frequency spectrum band during the ninth LBT frame 425-a. Operator 3 may similarly perform a tenth CCA 430-b and an eleventh CCA 430-c to gain respective access to a tenth LBT frame 425-b and an eleventh LBT frame 425-c. However, because Operator 2 is already using the unlicensed radio frequency spectrum band, the tenth CCA 430-b and the eleventh CCA 430-c will fail and Operator 3 may not win contention to access the unlicensed radio frequency spectrum band during the tenth LBT frame 425-b or the eleventh LBT frame 425-c. At a next CCA opportunity, Operator 3 may perform a twelfth CCA 430-d to gain access to a twelfth LBT frame 425-d. Because the unlicensed radio frequency spectrum band is not in use, Operator 3 may transmit over the unlicensed radio frequency spectrum band during the twelfth LBT frame 425-*d*.

Figure 5:
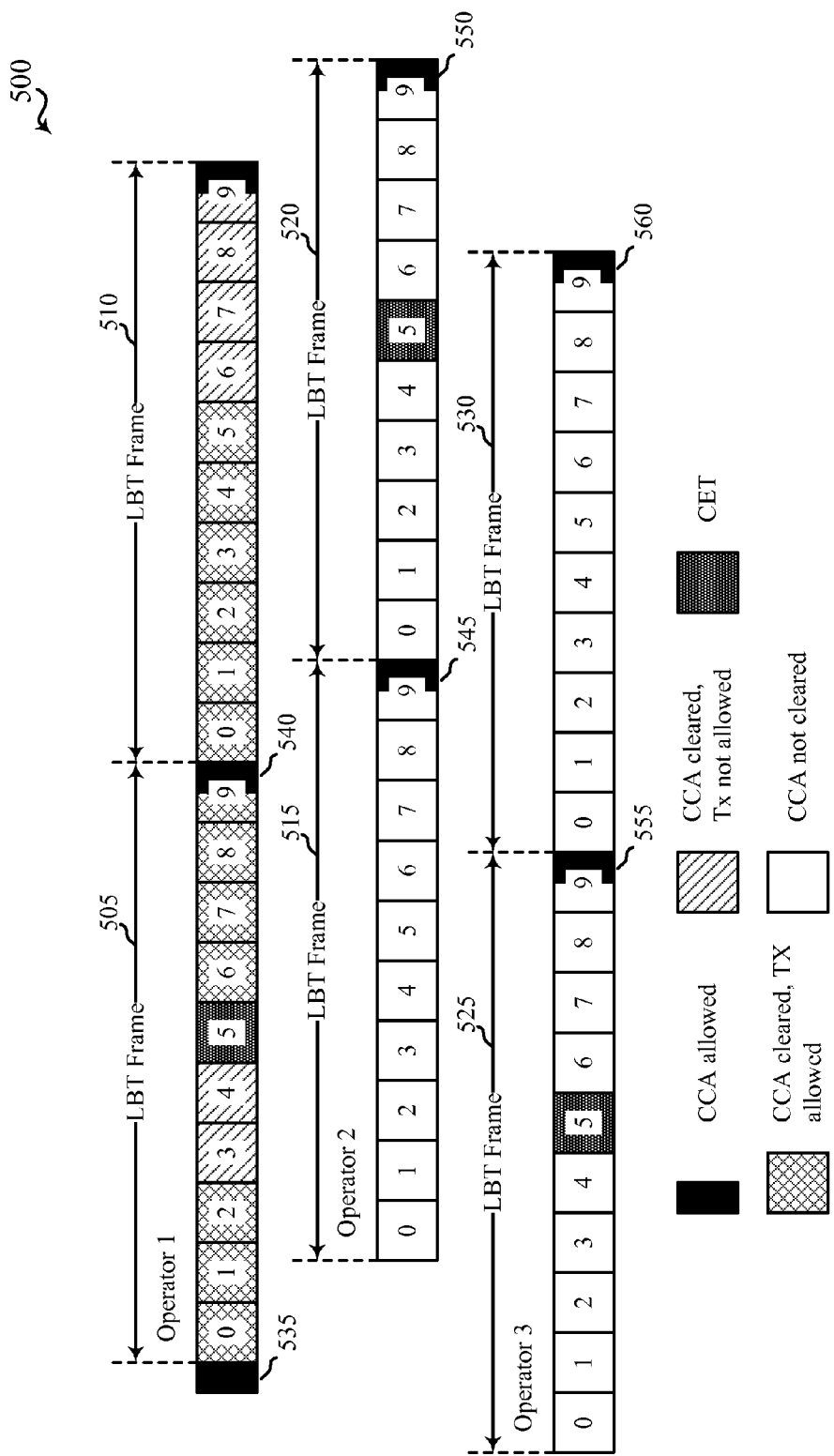
FIG. 5 shows example transmissions over an unlicensed radio frequency spectrum band, of three base stations of three respective asynchronous operators (e.g., Operator 1, Operator 2, and Operator 3), in accordance with various aspects of the present disclosure.

FIG. 5 shows example transmissions 500, over an unlicensed radio frequency spectrum band, of three base stations of three respective asynchronous operators (e.g., Operator 1, Operator 2, and Operator 3), in accordance with various aspects of the present disclosure. As shown, Operator 1 may gain access to the unlicensed radio frequency spectrum band during a first LBT frame 505 after performing a CCA 535. However, because Operator 1 is aware that Operator 3 will transmit a CET during a subframe 5 of a fifth LBT frame 525, during parts of a subframe 3 and a subframe 4 of the first LBT frame 505, Operator 1 may discontinue transmissions during the subframe 3 and the subframe 4 of the first LBT frame 505. The discontinuation of transmissions may be limited to subframes (or other transmission periods) that overlap the CET of Operator 3, to limit overhead. During a subframe 5 of the first LBT frame 505, Operator 1 may transmit its own CET. Thereafter, Operator 1 may continue its transmissions over the unlicensed radio frequency spectrum band in a subframe 6, a subframe 7, a subframe 8, and part of a subframe 9 of the first LBT frame 505. In the latter part of the subframe 9 of the first LBT frame 505, Operator 1 may gain access to the unlicensed radio frequency spectrum band during a second LBT frame 510 after successfully performing a CCA 540. Because Operator 1 is aware that Operator 2 will transmit a CET during a subframe 5 of a fourth LBT frame 520, during parts of a subframe 6 and a subframe 7 of the second LBT frame 510, Operator 1 may discontinue transmissions during the subframe 6 and the subframe 7 of the second LBT frame 510. During a subframe 8 and a subframe 9 of the second LBT frame 510, and because the CCA 540 was performed to gain access to the entirety of the second LBT frame 510, Operator 1 may in some cases continue transmissions in the subframe 8 and the subframe 9. However, when Operator 1 discontinues transmissions during the subframe 6 and the subframe 7, there exists an opportunity for other devices to gain access to the unlicensed radio frequency spectrum band. For example, because the CET transmitted by the Operator 2 does not fill the duration of the subframe 6 and the subframe 7, another transmitting apparatus (e.g., a Wi-Fi apparatus) may have an opportunity to perform CCA and gain access to the unlicensed radio frequency spectrum band. FIG. 5 assumes that a Wi-Fi apparatus (not shown) gains access to the unlicensed radio frequency spectrum band during the portion of the subframe 7 in which the Operator 1, the Operator 2, and the Operator 3 are not transmitting. As a result, and by way of example, FIG. 5 shows Operator 1 to discontinue transmissions during the subframe 7, the subframe 8, and the subframe 9. Assuming that the Wi-Fi apparatus continues to transmit through the subframe 8 of the second LBT frame 510, a CCA 560 performed by Operator 3 during the subframe 9 of a sixth LBT frame 530 may not be successful. Thus, Operator 3 may not be able to gain access to a next LBT frame despite the fact that Operator 1 and Operator 2 do not have access to the unlicensed radio frequency spectrum band when Operator 3 performs the CCA 560.

Because of the asynchronous timings of the CCAs performed by Operator 1, Operator 2, and Operator 3, and the relationships of the timings of the CCAs 545, 550, 555, and 560, Operator 1 may prevent Operator 2 and Operator 3 from accessing the unlicensed radio frequency spectrum band during a third LBT frame 515, the fourth LBT frame 520, and the fifth LBT frame 525. However, if Operator 1 implements an N/K protocol with N=2 and K=1, Operator 1 may relinquish the unlicensed radio frequency spectrum band following the second LBT frame 510, thereby allowing Operator 2 to gain access to the unlicensed radio frequency spectrum band following the fourth LBT frame 520 (that is, assuming the Wi-Fi device that gained access to the unlicensed radio frequency spectrum band during the subframe 7 of the second LBT frame 510 has discontinued transmissions).

Because Operator 1 discontinues transmissions during the CET of Operator 2 in subframe 5 of the fourth LBT frame 520, and during the CET of Operator 3 in subframe 5 of the fifth LBT frame 525, mobile devices for which base stations of Operator 2 and Operator 3 function as serving base stations may be better able to detect the CETs of their respective serving base stations, due to reduced interference from a base station (or base stations) of Operator 1. CETs may in some cases be used for radio resource management (RRM) measurements, and therefore need to be detectable.

A first base station of a first operator may need to periodically discontinue transmissions over an unlicensed radio frequency spectrum band to monitor for CET timing information of a second base station of a second operator. After identifying transmission timings of CETs of the second base station of the second operator, the first base station of the first operator may discontinue transmissions during the transmission timings of the CETs of the second base station of the second operator (e.g., to protect the CETs of the second base station).

Protected CETs may include downlink CETs, and in some cases may include uplink CETs. CET timing information for uplink CETs of a base station may be advertised in downlink CETs of the base station.

Figure 6:
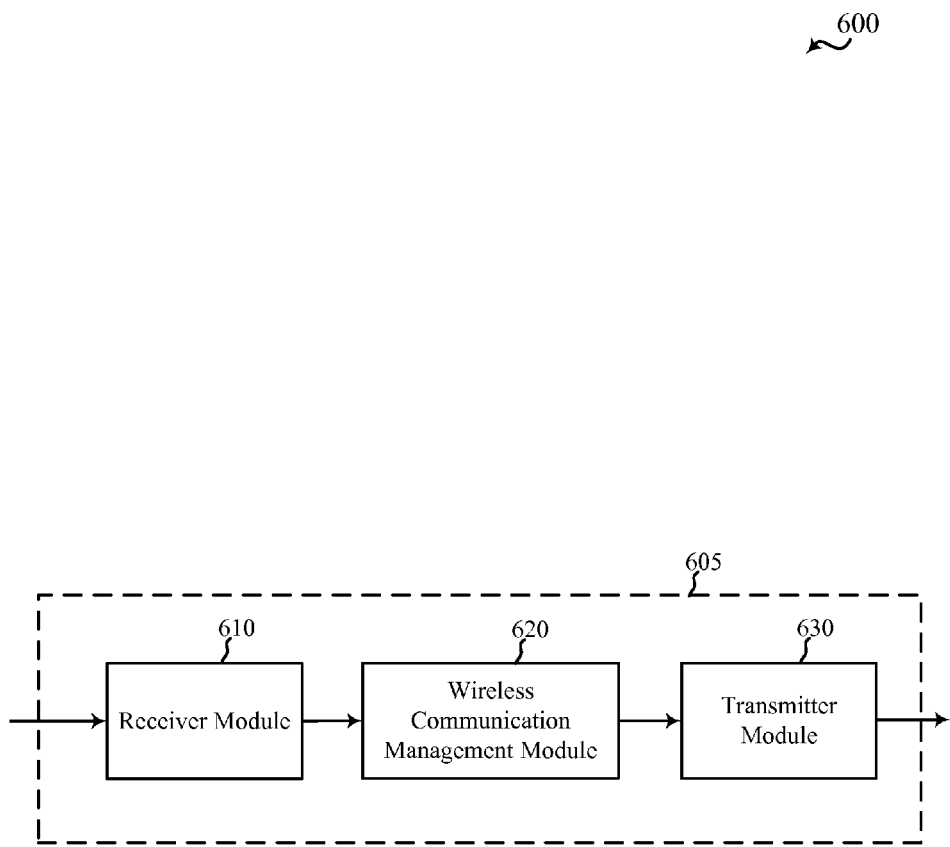
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. In some examples, the apparatus 605 may be an example of aspects of one or more of the base stations 105 and/or 205 described with reference to FIGS. 1 and/or 2. The apparatus 605 may also be an example of aspects of one or more of the mobile devices 115 and/or 215 described with reference to FIGS. 1 and/or 2. The apparatus 605 may also be a processor. The apparatus 605 may include a receiver module 610, a wireless communication management module 620, and/or a transmitter module 630. Each of these components may be in communication with each other.

The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications). In some examples, both the licensed radio frequency spectrum band and the unlicensed radio frequency spectrum band may be used for LTE/LTE-A communications, as described, for example, with reference to FIGS. 1 and/or 2. The receiver module 610 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 630 may include at least one RF transmitter, such as at least one RF transmitter operable to transmit over the licensed radio frequency spectrum band and/or the unlicensed radio frequency spectrum band. The transmitter module 630 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In examples of the apparatus 605 in which the apparatus 605 is configured as (or to provide) a first base station of a first operator, the wireless communication management module 620 may be used by the apparatus 605 to monitor for uplink configuration information and downlink configuration information associated with a second base station of a second operator. The second base station of the second operator may be a neighboring base station of the first base station of the first operator. The wireless communication management module 620 may further identify a transmission timing of one or more uplink transmissions (e.g., uplink subframes used for uplink transmissions) to the second base station of the second operator based at least in part on the uplink configuration information, and prohibit access to the unlicensed radio frequency spectrum band by the first base station of the first operator during the identified transmission timing of the one or more uplink transmissions (e.g., uplink subframes). Transmissions of the second base station of the second operator (including, for example, LBT frames, CUBS, downlink subframes, uplink subframes, and/or CETs) in the unlicensed radio frequency spectrum band may be asynchronous to transmissions of the first base station of the first operator in the unlicensed radio frequency spectrum band.

In examples of the apparatus 605 in which the apparatus 605 is configured as (or to provide) a mobile device, the wireless communication management module 620 may be used to provide a report or other information available to (or generated by) the mobile device to a serving base station of the mobile device. The serving base station may in some cases be the first base station of the first operator. A report from the mobile device may take a variety of forms. In one example, a report from the mobile device may include a timing difference between the first base station of the first operator and the second base station of the second operator (e.g., a timing difference between a first PLMN of the first operator and a second PLMN of the second operator), wherein the mobile device is served by the first base station of the first operator. The timing difference may in some cases be reported as a system frame number (SFN), a subframe number difference, and a timing difference within a subframe. In another example, the report from the mobile device may include a timing difference between a reference CET timing and transmission timings of CETs of the second base station of the second operator. In the above and other examples, the report from the mobile device may include a PLMN identifier of the second operator, with the mobile device being a member of a PLMN of the first operator. The PLMN identifier of the second operator may enable the report to be indexed by the first base station of the first operator, for use in identifying transmission timings of CETs of the second base station of the second operator. Upon identifying the transmission timings of the CETs of the second base station of the second operator, the first base station may discontinue transmissions during the transmission timings of the CETs of the second base station of the second operator.

Figure 7:
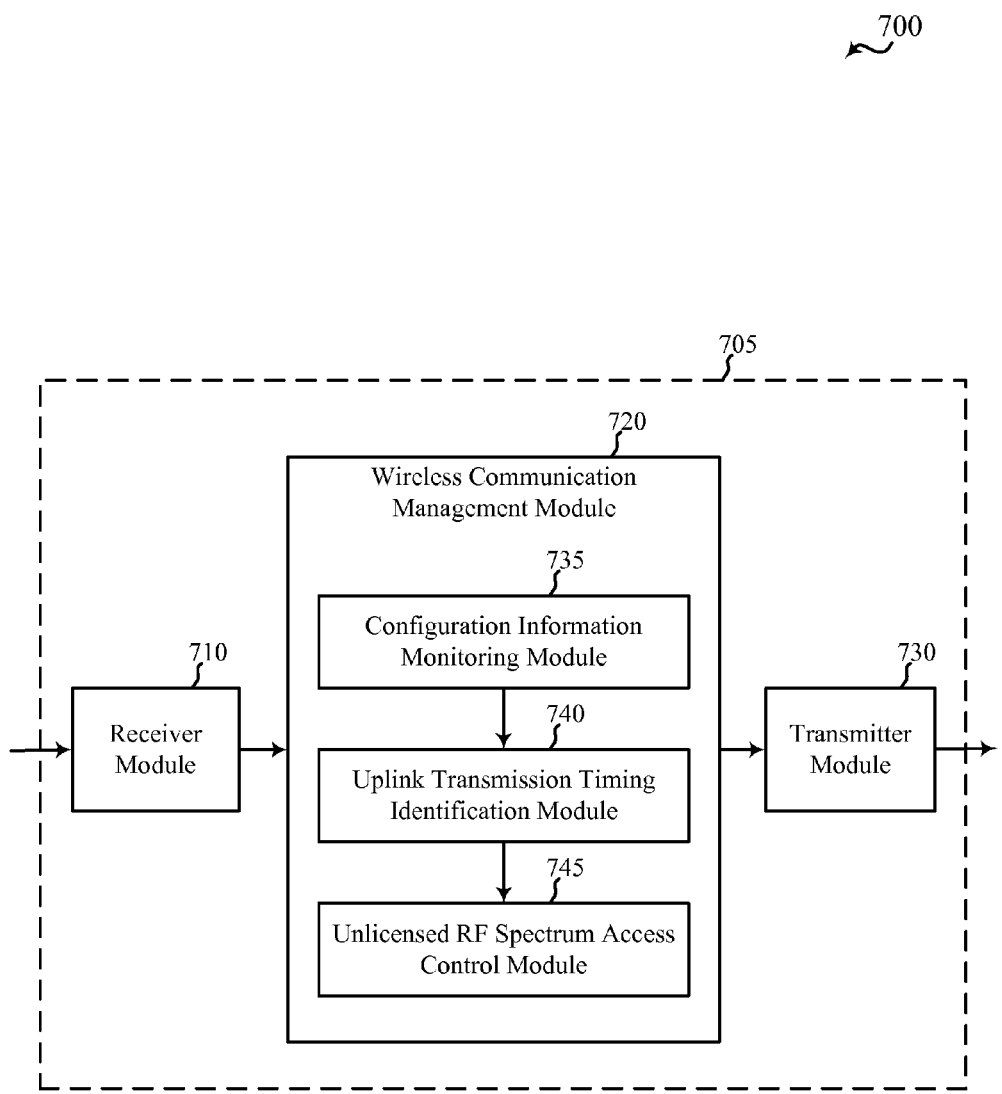
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more of the base stations 105 and/or 205 described with reference to FIGS. 1 and/or 2, and/or an example of aspects of the apparatus 605 described with reference to FIG. 6. The apparatus 705 may also be a processor. The apparatus 705 may include a receiver module 710, a wireless communication management module 720, and/or a transmitter module 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications). In some examples, both the licensed radio frequency spectrum band and the unlicensed radio frequency spectrum band may be used for LTE/LTE-A communications, as described, for example, with reference to FIG. 2. The receiver module 710 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 730 may include at least one RF transmitter, such as at least one RF transmitter operable to transmit over the licensed radio frequency spectrum band and/or the unlicensed radio frequency spectrum band. The transmitter module 730 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 720 may be an example of one or more aspects of the wireless communication management module 620 described with reference to FIG. 6. The wireless communication management module 720 may include a configuration information monitoring module 735, an uplink transmission timing identification module 740, and/or an unlicensed RF spectrum access control module 745. Each of these components may be in communication with each other.

In some examples, the configuration information monitoring module 735 may be used by a first base station of a first operator to monitor for uplink configuration information and downlink configuration information associated with a second base station of a second operator. In some examples, the apparatus 705 may provide or be the first base station of the first operator. The second base station of the second operator may be a neighboring base station of the first base station of the first operator. Transmissions of the second base station of the second operator (including, for example, LBT frames, CUBS, downlink subframes, uplink subframes, and/or CETs) in the unlicensed radio frequency spectrum band may be asynchronous to transmissions of the first base station of the first operator in the unlicensed radio frequency spectrum band.

In some examples, the second base station of the second operator may advertise a TDD configuration of the second base station of the second operator. The TDD configuration may be advertised, for example, at the beginning of an LBT frame and/or at the beginning of a burst of N frames. The TDD configuration may change from frame to frame or from burst to burst. In some examples, the configuration information monitoring module 735 may monitor one or more slots of an LBT frame (e.g., one or more slots in which CUBS and/or CETs may be transmitted by the second base station of the second operator) for the uplink configuration information and the downlink configuration information.

In some examples, the uplink configuration information and the downlink configuration information may be dynamic, and may indicate an actual uplink and/or downlink configuration in one or more frames (e.g., one or more LBT frames). Dynamic uplink configuration information and downlink configuration information may be obtained, for example, from monitored uplink grants, or from signals such as CUBS and/or a downlink control region of a frame used for wireless communication (e.g., an LBT frame).

In some examples, the uplink configuration information and the downlink configuration information may be semi-static, and may indicate, for example, a reference uplink and/or downlink configuration in one or more frames (e.g., one or more LBT frames). Semi-static uplink configuration information and downlink configuration information may be obtained, for example, from monitored CETs of the second base station of the second operator. Semi-static uplink configuration information and downlink configuration information may facilitate mobile device measurements.

In some examples, the uplink transmission timing identification module 740 may be used to identify a transmission timing of one or more uplink transmissions (e.g., uplink subframes used for uplink transmissions) to the second base station of the second operator based at least in part on the uplink configuration information.

In some examples, the unlicensed RF spectrum access control module 745 may be used to prohibit access to the unlicensed radio frequency spectrum band by the first base station of the first operator during the identified transmission timing of the one or more uplink transmissions (e.g., uplink subframes). In some examples, this may include causing the first base station to bypass one or more downlink CCAs for gaining access to an LBT frame of at least one channel of the unlicensed radio frequency spectrum band, which CCAs would have been performed during the transmission timing of the one or more uplink subframes. The at least one channel of the unlicensed radio frequency spectrum band may include at least one channel over which the one or more uplink subframes used for the uplink transmissions to the second base station of the second operator are transmitted. In this manner, the first base station of the first operator is less likely to interfere with the transmission of the one or more uplink subframes used for the uplink transmissions to the second base station of the second operator. Access to the unlicensed radio frequency spectrum band by the first base station of the first operator may be prohibited despite an energy detection threshold for the unlicensed radio frequency spectrum band (e.g., for one or more channels of the unlicensed radio frequency spectrum band) not being satisfied.

Figure 8:
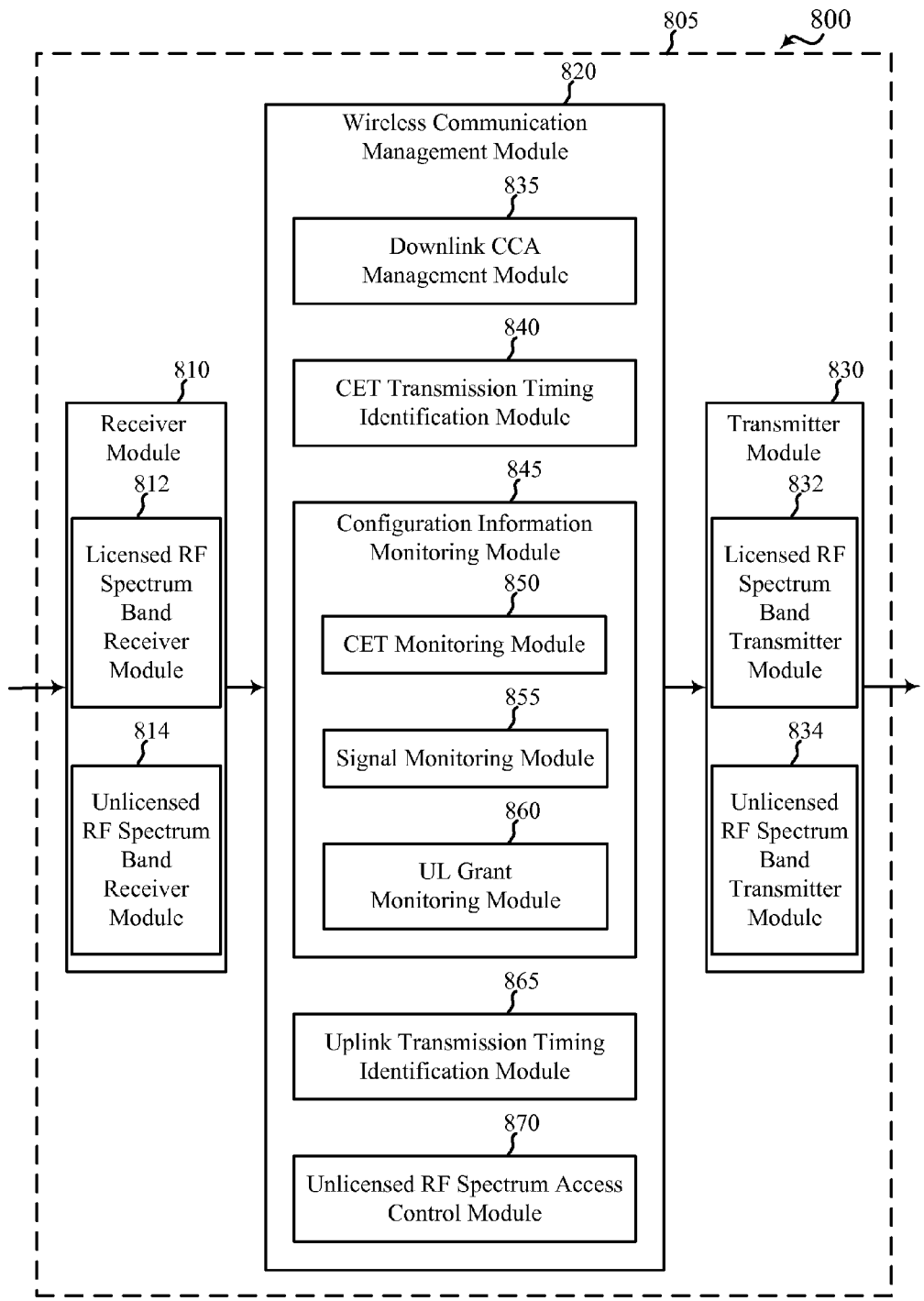
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more of the base stations 105 and/or 205 described with reference to FIGS. 1 and/or 2, and/or an example of one or more of the apparatuses 605 and/or 705 described with reference to FIGS. 6 and/or 7. The apparatus 805 may also be a processor. The apparatus 805 may include a receiver module 810, a wireless communication management module 820, and/or a transmitter module 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications). In some examples, both the licensed radio frequency spectrum band and the unlicensed radio frequency spectrum band may be used for LTE/LTE-A communications, as described, for example, with reference to FIG. 2. The receiver module 810 may in some cases include separate receivers for the licensed radio frequency spectrum band and the unlicensed radio frequency spectrum band. The separate receivers may, in some examples, take the form of a licensed RF spectrum band receiver module 812 for communicating over the licensed radio frequency spectrum band, and an unlicensed RF spectrum band receiver module 814 for communicating over the unlicensed radio frequency spectrum band. The receiver module 810, including the licensed RF spectrum band receiver module 812 and/or the unlicensed RF spectrum band receiver module 814, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 830 may include at least one RF transmitter, such as at least one RF transmitter operable to transmit over the licensed radio frequency spectrum band and/or the unlicensed radio frequency spectrum band. The transmitter module 830 may in some cases include separate transmitters for the licensed radio frequency spectrum band and the unlicensed radio frequency spectrum band. The separate transmitters may, in some examples, take the form of a licensed RF spectrum band transmitter module 832 for communicating over the licensed radio frequency spectrum band, and an unlicensed RF spectrum band transmitter module 834 for communicating over the unlicensed radio frequency spectrum band. The transmitter module 830, including the licensed RF spectrum band transmitter module 832 and/or the unlicensed RF spectrum band transmitter module 834, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 820 may be an example of one or more aspects of the wireless communication management module 620 and/or 720 described with reference to FIGS. 6 and/or 7. The wireless communication management module 820 may include a downlink CCA management module 835, a CET transmission timing identification module 840, a configuration information monitoring module 845, an uplink transmission timing identification module 865, and/or an unlicensed RF spectrum access control module 870. Each of these components may be in communication with each other.

The downlink CCA management module 835 may be used by a first base station of a first operator to perform a downlink CCA for gaining access to an LBT frame of at least one channel of an unlicensed radio frequency spectrum band. In some examples, the apparatus 805 may provide or be the first base station of the first operator. By way of example, the LBT frame may have a duration of two milliseconds, five milliseconds, or ten milliseconds. The downlink CCA may be performed during a number of OFDM symbols, which number of OFDM symbols may occur at a beginning of a first subframe of the LBT frame, or at or near an end of a preceding LBT frame.

The CET transmission timing identification module 840 may be used to identify transmission timings of CETs of a second base station of a second operator and/or transmission timings of uplink CETs of a number of mobile devices communicating with the second base station of the second operator. The second base station of the second operator may be a neighboring base station of the first base station of the first operator. Transmissions of the second base station of the second operator in an unlicensed radio frequency spectrum band, and/or transmissions of the number of mobile devices communicating with the second base station of the second operator in the unlicensed radio frequency spectrum band, may be asynchronous to transmissions of the first base station of the first operator in the unlicensed radio frequency spectrum band. The asynchronous transmissions may include, for example, LBT frames, CUBS, downlink subframes, uplink subframes, and/or CETs.

In some examples, the CET transmission timing identification module 840 may detect the transmission timings of the CETs of the second base station of the second operator directly from the second base station of the second operator (e.g., from a CET of the second base station of the second operator). The CET transmission timing identification module 840 may identify transmission timings of the uplink CETs of the number of mobile devices communicating with the second base station of the second operator from the CETs of the second base station of the second operator (e.g., by decoding information contained in the CETs of the second base station of the second operator).

The unlicensed RF spectrum access control module 870 may be used to discontinue the transmissions of the first base station of the first operator (e.g., discontinue transmissions of one or more cells of the first base station of the first operator) during the transmission timings of the CETs of the second base station of the second operator and/or the transmission timings of the uplink CETs of the number of mobile devices communicating with the second base station of the second operator. The one or more cells of the first base station of the first operator may use the unlicensed radio frequency spectrum band. In some examples, the transmissions may be discontinued for one or more LBT frames, subframes, or other transmission increments that overlap the transmission timings of the CETs of the second base station of the second operator and/or the transmission timings of the uplink CETs of the number of mobile devices communicating with the second base station of the second operator.

In some examples, the unlicensed RF spectrum access control module 870 may discontinue the transmissions of the first base station of the first operator during 1) the transmission timings of CETs of one or more base stations of one or more operator, and/or 2) the transmission timings of uplink CETs of one or more mobile devices communicating with the second base station of the second operator.

In some examples, the configuration information monitoring module 845 may include a CET monitoring module 850, a signal monitoring module 855, and/or a UL grant monitoring module 860. The configuration information monitoring module 845 may be used by the first base station of the first operator to monitor for uplink configuration information and downlink configuration information associated with a second base station of a second operator.

In examples of the apparatus 805 including the CET monitoring module 850, the CET monitoring module 850 may be used by the first base station of the first operator to detect a CET directly from the second base station of the second operator, wherein the CET includes the uplink configuration information and the downlink configuration information. The CET detected from the second base station of the second operator may include, for example, information relating to a paging channel used by the second base station of the second operator and/or one or more SIBs, from which the uplink configuration information and the downlink configuration information may be obtained or derived.

In examples of the apparatus 805 including the signal monitoring module 855, the signal monitoring module 855 may be used by the first base station of the first operator to receive a signal including the uplink configuration information and the downlink configuration information. The signal may be received when a downlink CCA performed by the second base station of the second operator is successful. By way of example, the signal may include a CUBS and/or be embedded in a downlink control region of a frame (e.g., an LBT frame) used for wireless communication.

In examples of the apparatus 805 including the UL grant monitoring module 860, the UL grant monitoring module 860 may be used to identify the uplink configuration information and the downlink configuration information based at least in part on one or more uplink grants by the second base station of the second operator. In some cases, this may include dynamically identifying the transmission timing of the one or more uplink subframes based at least in part on the uplink configuration information identified from the one or more uplink grants.

In some examples, the uplink transmission timing identification module 865 may be used to identify a transmission timing of one or more uplink subframes used for uplink transmissions to the second base station of the second operator based at least in part on the uplink configuration information.

In some examples, the unlicensed RF spectrum access control module 870 may be used to prohibit access to the unlicensed radio frequency spectrum band by the first base station of the first operator during the identified transmission timing of the one or more uplink subframes. In some examples, this may include causing the first base station to bypass one or more downlink CCAs for gaining access to an LBT frame of at least one channel of the unlicensed radio frequency spectrum band, which CCAs would have been performed during the transmission timing of the one or more uplink subframes. The at least one channel of the unlicensed radio frequency spectrum band may include at least one channel over which the one or more uplink subframes used for the uplink transmissions to the second base station of the second operator are transmitted. In this manner, the first base station of the first operator is less likely to interfere with the transmission of the one or more uplink subframes used for the uplink transmissions to the second base station of the second operator. Access to the unlicensed radio frequency spectrum band by the first base station of the first operator may be prohibited despite an energy detection threshold for the unlicensed radio frequency spectrum band (e.g., for one or more channels of the unlicensed radio frequency spectrum band) not being satisfied.

Figure 9:
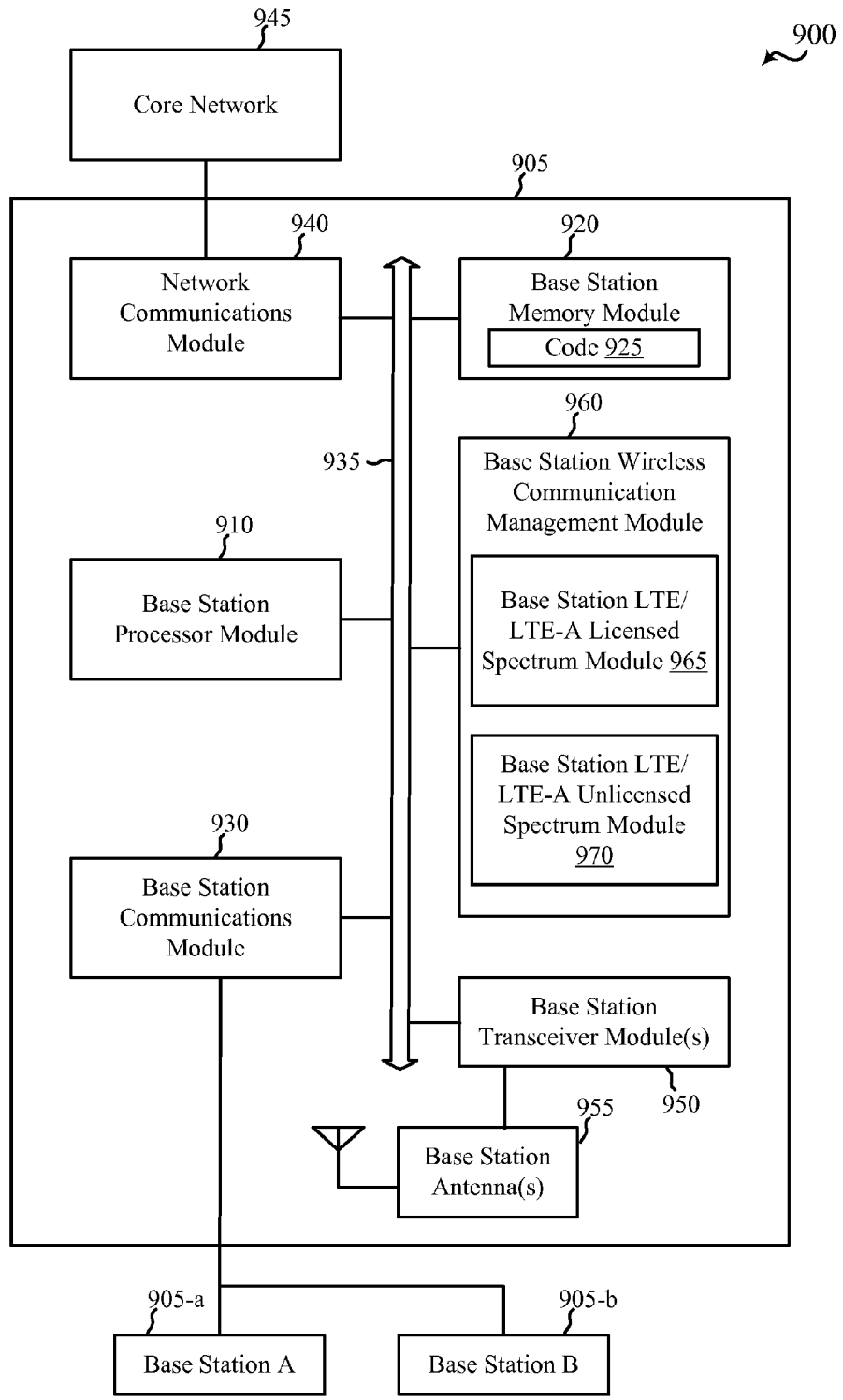
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of aspects of one or more of the base stations 105 and/or 205 described with reference to FIGS. 1 and/or 2, and/or aspects of one or more of the apparatuses 605, 705, and/or 805 described with reference to FIGS. 6, 7, and/or 8 (e.g., when configured as a base station). The base station 905 may be configured to implement or facilitate at least some of the base station and/or apparatus features and functions described with reference to FIGS. 1, 2, 3, 4, 5, 6, and/or 7.

The base station 905 may include a base station processor module 910, a base station memory module 920, at least one base station transceiver module (represented by base station transceiver module(s) 950), at least one base station antenna (represented by base station antenna(s) 955), and/or a base station wireless communication management module 960. The base station 905 may also include one or more of a base station communications module 930 and/or a network communications module 940. Each of these components may be in communication with each other, directly or indirectly, over one or more buses 935.

The base station memory module 920 may include random access memory (RAM) and/or read-only memory (ROM). The base station memory module 920 may store computer-readable, computer-executable code 925 containing instructions that are configured to, when executed, cause the base station processor module 910 to perform various functions described herein related to wireless communication. Alternatively, the computer-executable code 925 may not be directly executable by the base station processor module 910 but be configured to cause the base station 905 (e.g., when compiled and executed) to perform various of the functions described herein.

The base station processor module 910 may include an intelligent hardware device, e.g., a central processing unit (CPU), a microcontroller, an ASIC, etc. The base station processor module 910 may process information received through the base station transceiver module(s) 950, the base station communications module 930, and/or the network communications module 940. The base station processor module 910 may also process information to be sent to the base station transceiver module(s) 950 for transmission through the base station antenna(s) 955, to the base station communications module 930, for transmission to one or more other base stations, base station A 905-a and base station B 905-b, and/or to the network communications module 940 for transmission to a core network 945, which may be an example of one or more aspects of the core network 130 described with reference to FIG. 1. The base station processor module 910 may handle, alone or in connection with the base station wireless communication management module 960, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications).

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in the first radio frequency spectrum band and/or the second radio frequency spectrum band. The base station transceiver module(s) 950 may be configured to communicate bi-directionally, via the base station antenna(s) 955, with one or more mobile stations or apparatuses, such as one or more of the mobile devices 115 and/or 215 described with reference to FIGS. 1 and/or 2, and/or the apparatus 605 described with reference to FIG. 6 configured as a mobile device, for example. The base station 905 may, for example, include multiple base station antennas 955 (e.g., an antenna array). The base station 905 may communicate with the core network 945 through the network communications module 940. The base station 905 may also communicate with other base stations, such as the base stations, base station A 905-*a* and base station B 905-*b*, using the base station communications module 930.

The base station wireless communication management module 960 may be configured to perform and/or control some or all of the features and/or functions described with reference to FIGS. 1, 2, 3, 4, 5, 6, and/or 7 related to wireless communication over the first radio frequency spectrum band and/or the second radio frequency spectrum band. For example, the base station wireless communication management module 960 may be configured to support a supplemental downlink mode, a carrier aggregation mode, and/or a standalone mode using the first radio frequency spectrum band and/or the second radio frequency spectrum band. The base station wireless communication management module 960 may include a base station LTE/LTE-A licensed spectrum module 965 configured to handle LTE/LTE-A communications in the first radio frequency spectrum band, and a base station LTE/LTE-A unlicensed spectrum module 970 configured to handle LTE/LTE-A communications in the second radio frequency spectrum band. The base station wireless communication management module 960, or portions of it, may include a processor, and/or some or all of the functions of the base station wireless communication management module 960 may be performed by the base station processor module 910 and/or in connection with the base station processor module 910. In some examples, the base station wireless communication management module 960 may be an example of the wireless communication management module 620, 720, and/or 820 described with reference to FIGS. 6, 7, and/or 8.

Figure 10:
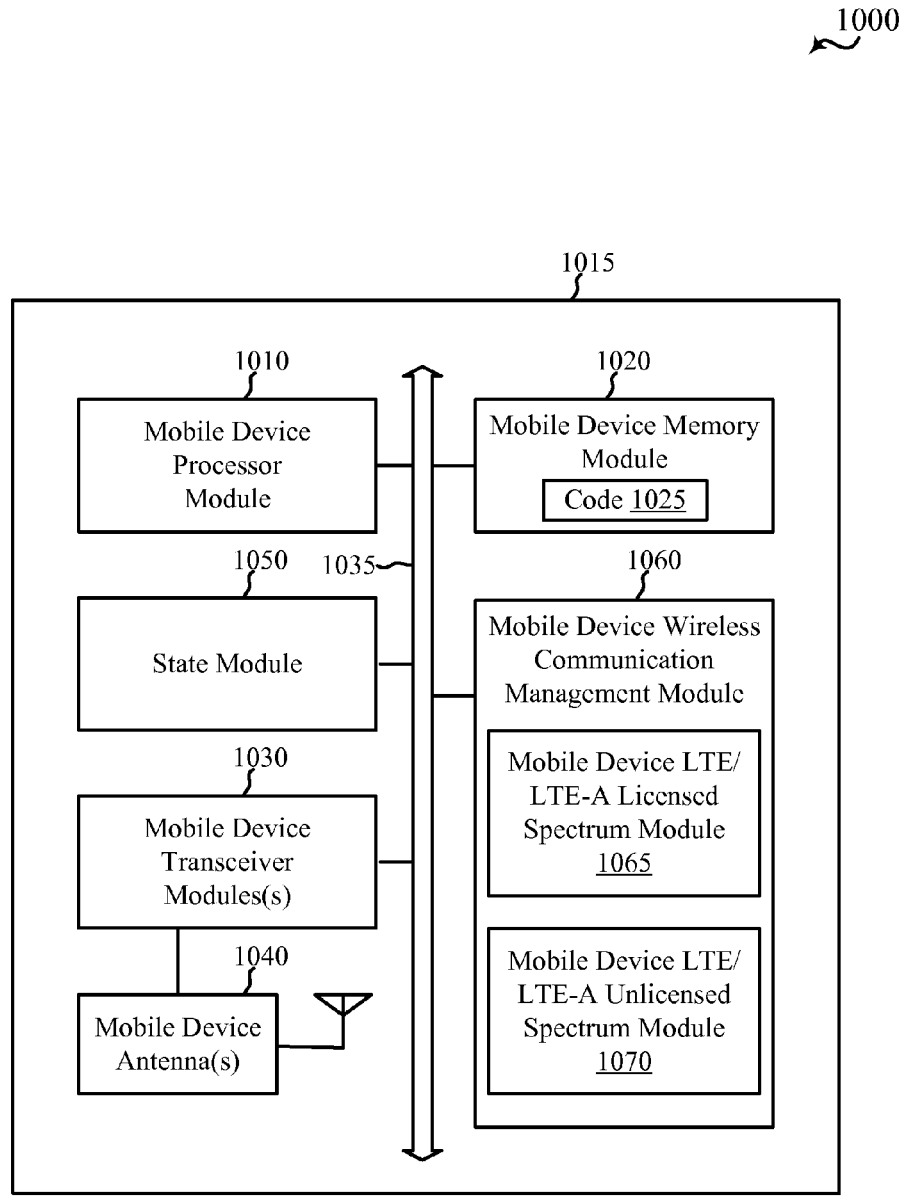
FIG. 10 shows a block diagram of a mobile device (e.g., a UE) for use in wireless communication, in accordance with various aspects of the present disclosure.

FIG. 10 shows a block diagram 1000 of a mobile device 1015 (e.g., a UE) for use in wireless communication, in accordance with various aspects of the present disclosure. The mobile device 1015 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The mobile device 1015 may, in some examples, have an internal power supply (not shown), such as a small battery, to facilitate mobile operation. In some examples, the mobile device 1015 may be an example of aspects of one or more of the mobile devices 115 and/or 215 described with reference to FIGS. 1 and/or 2, and/or aspects of the apparatus 605 described with reference to FIG. 6. The mobile device 1015 may be configured to implement at least some of the mobile device and/or apparatus features and functions described with reference to FIGS. 1, 2, 3, 4, and/or 5.

The mobile device 1015 may include a mobile device processor module 1010, a mobile device memory module 1020, at least one mobile device transceiver module (represented by mobile device transceiver module(s) 1030), at least one mobile device antenna (represented by mobile device antenna(s) 1040), and/or a mobile device wireless communication management module 1060. Each of these components may be in communication with each other, directly or indirectly, over one or more buses 1035.

The mobile device memory module 1020 may include RAM and/or ROM. The mobile device memory module 1020 may store computer-readable, computer-executable code 1025 containing instructions that are configured to, when executed, cause the mobile device processor module 1010 to perform various functions described herein related to handover, cell reselection, or an initial access procedure. Alternatively, the computer-executable code 1025 may not be directly executable by the mobile device processor module 1010 but be configured to cause the mobile device 1015 (e.g., when compiled and executed) to perform various of the functions described herein.

The mobile device processor module 1010 may include an intelligent hardware device, e.g., a CPU, a microcontroller, an ASIC, etc. The mobile device processor module 1010 may process information received through the mobile device transceiver module(s) 1030 and/or information to be sent to the mobile device transceiver module(s) 1030 for transmission through the mobile device antenna(s) 1040. The mobile device processor module 1010 may handle, alone or in connection with the mobile device wireless communication management module 1060, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications).

The mobile device transceiver module(s) 1030 may include a modem configured to modulate packets and provide the modulated packets to the mobile device antenna(s) 1040 for transmission, and to demodulate packets received from the mobile device antenna(s) 1040. The mobile device transceiver module(s) 1030 may, in some examples, be implemented as one or more mobile device transmitter modules and one or more separate mobile device receiver modules. The mobile device transceiver module(s) 1030 may support communications in the first radio frequency spectrum band and/or the second radio frequency spectrum band. The mobile device transceiver module(s) 1030 may be configured to communicate bi-directionally, via the mobile device antenna(s) 1040, with one or more of the base stations 105 and/or 205 described with reference to FIGS. 1 and/or 2, and/or the apparatus 605 described with reference to FIG. 6 (e.g., when configured as a base station). While the mobile device 1015 may include a single mobile device antenna, there may be examples in which the mobile device 1015 may include multiple mobile device antennas 1040.

The state module 1050 may be used, for example, to manage transitions of the mobile device 1015 between an RRC idle state and an RRC connected state, and may be in communication with other components of the mobile device 1015, directly or indirectly, over the one or more buses 1035. The state module 1050, or portions of it, may include a processor, and/or some or all of the functions of the state module 1050 may be performed by the mobile device processor module 1010 and/or in connection with the mobile device processor module 1010.

The mobile device wireless communication management module 1060 may be configured to perform and/or control some or all of the features and/or functions described with reference to FIGS. 1, 2, 3, 4, and/or 5 related to wireless communication over the first radio frequency spectrum band and/or the second radio frequency spectrum band. For example, the mobile device wireless communication management module 1060 may be configured to support a supplemental downlink mode, a carrier aggregation mode, and/or a standalone mode using the first radio frequency spectrum band and/or the second radio frequency spectrum band. The mobile device wireless communication management module 1060 may include a mobile device LTE/LTE-A licensed spectrum module 1065 configured to handle LTE/LTE-A communications in the first radio frequency spectrum band, and a mobile device LTE/LTE-A unlicensed spectrum module 1070 configured to handle LTE/LTE-A communications in the second radio frequency spectrum. The mobile device wireless communication management module 1060, or portions of it, may include a processor, and/or some or all of the functions of the mobile device wireless communication management module 1060 may be performed by the mobile device processor module 1010 and/or in connection with the mobile device processor module 1010. In some examples, the mobile device wireless communication management module 1060 may be an example of the wireless communication management module 620 described with reference to FIG. 6.

Figure 11:
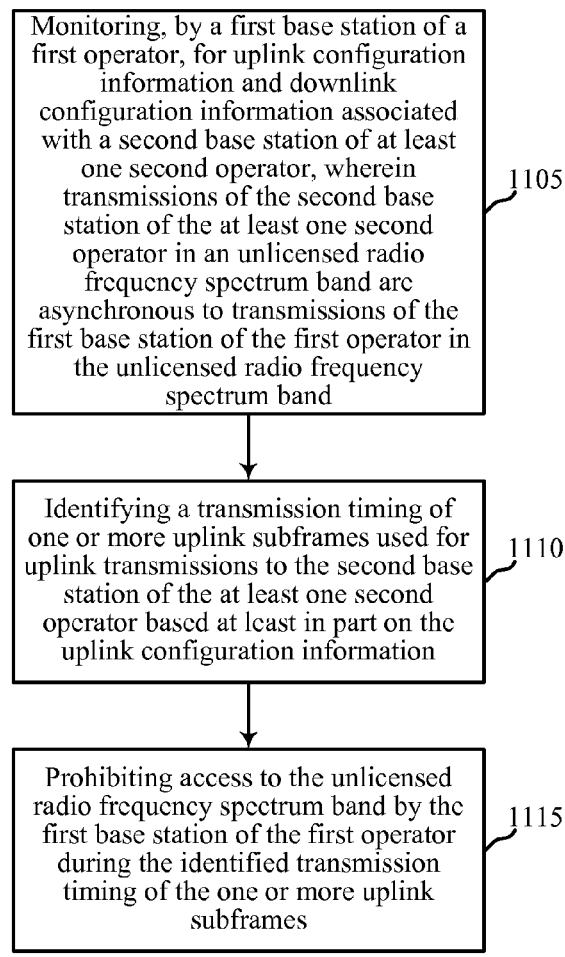
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105, 205, and/or 905 described with reference to FIGS. 1, 2, and/or 9, and/or aspects of one or more of the apparatuses 605, 705, and/or 805 described with reference to FIGS. 6, 7, and/or 8. In some examples, a base station and/or apparatus may execute one or more sets of codes to control the functional elements of the base station and/or apparatus to perform the functions described below.

At block 1105, the method 1100 may include monitoring, by a first base station of a first operator, for uplink configuration information and downlink configuration information associated with a second base station of a second operator. The second base station of the second operator may be a neighboring base station of the first base station of the first operator. In some examples, the first base station may be the base station 105, 205, and/or 905 described with reference to FIGS. 1, 2, and/or 9, and/or the first base station may include (or be included in) the apparatus 605, 705, and/or 805 described with reference to FIGS. 6, 7, and/or 8. Transmissions of the second base station of the second operator (including, for example, LBT frames, CUBS, downlink subframes, uplink subframes, and/or CETs) in an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications) may be asynchronous to transmissions of the first base station of the first operator in the unlicensed radio frequency spectrum band.

In some examples, the second base station of the second operator may advertise a TDD configuration of the second base station of the second operator. The TDD configuration may be advertised, for example, at the beginning of an LBT frame and/or at the beginning of a burst of N frames. The TDD configuration may change from frame to frame or from burst to burst. In some examples, the monitoring may include monitoring one or more slots of an LBT frame (e.g., one or more slots in which CUBS and/or CETs may be transmitted by the second base station of the second operator) for the uplink configuration information and the downlink configuration information.

In some examples, the uplink configuration information and the downlink configuration information may be dynamic, and may indicate an actual uplink and/or downlink configuration in one or more frames (e.g., one or more LBT frames). Dynamic uplink configuration information and downlink configuration information may be obtained, for example, from monitored uplink grants, or from signals such as CUBS and/or a downlink control region of a frame used for wireless communication (e.g., an LBT frame).

In some examples, the uplink configuration information and the downlink configuration information may be semi-static, and may indicate, for example, a reference uplink and/or downlink configuration in one or more frames (e.g., one or more LBT frames). Semi-static uplink configuration information and downlink configuration information may be obtained, for example, from monitored CETs of the second base station of the second operator. Semi-static uplink configuration information and downlink configuration information may facilitate mobile device measurements.

The operation(s) at block 1105 may be performed using the wireless communication management module 720, 820, and/or 820 described with reference to FIGS. 6, 7, and/or 8, the configuration information monitoring module 735 and/or 845 described with reference to FIGS. 7 and/or 8, and/or the base station wireless communication management module 960 described with reference to FIG. 9.

At block 1110, the method 1100 may include identifying a transmission timing of one or more uplink transmissions (e.g., uplink subframes used for uplink transmissions) to the second base station of the second operator based at least in part on the uplink configuration information. The operation(s) at block 1110 may be performed using the wireless communication management module 620, 720, and/or 820 described with reference to FIGS. 6, 7, and/or 8, the uplink transmission timing identification module 740 and/or 865 described with reference to FIGS. 7 and/or 8, and/or the base station wireless communication management module 960 described with reference to FIG. 9.

At block 1115, the method 1100 may include prohibiting access to the unlicensed radio frequency spectrum band by the first base station of the first operator during the identified transmission timing of the one or more uplink transmissions (e.g., uplink subframes). In some examples, this may include bypassing one or more downlink CCAs for gaining access to an LBT frame of at least one channel of the unlicensed radio frequency spectrum band, which CCAs would have been performed during the transmission timing of the one or more uplink transmissions. The at least one channel of the unlicensed radio frequency spectrum band may include at least one channel over which the one or more uplink transmissions to the second base station of the second operator are transmitted. In this manner, the first base station of the first operator is less likely to interfere with the transmission of the one or more uplink transmissions to the second base station of the second operator. Access to the unlicensed radio frequency spectrum band by the first base station of the first operator may be prohibited despite an energy detection threshold for the unlicensed radio frequency spectrum band (e.g., for one or more channels of the unlicensed radio frequency spectrum band) not being satisfied. The operation(s) at block 1115 may be performed using the wireless communication management module 620, 720, and/or 820 described with reference to FIGS. 6, 7, and/or 8, the unlicensed RF spectrum access control module 745 and/or 870 described with reference to FIGS. 7 and/or 8, and/or the base station wireless communication management module 960 described with reference to FIG. 9.

Thus, the method 1100 may provide for wireless communication. It should be noted that the method 1100 is just one implementation and that the operations of the method 1100 may be rearranged or otherwise modified such that other implementations are possible.

Figure 12:
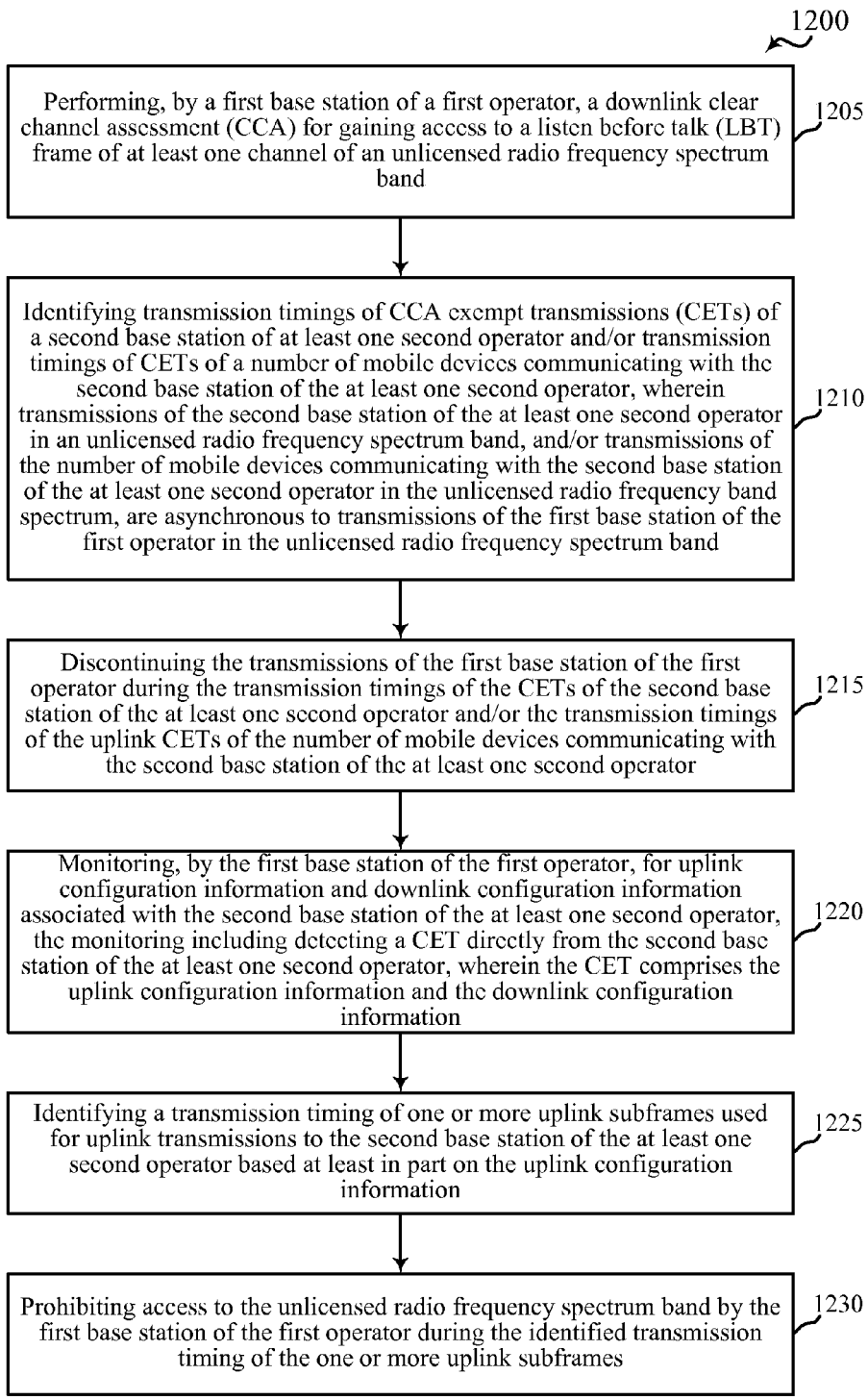
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105, 205, and/or 905 described with reference to FIGS. 1, 2, and/or 9, and/or aspects of one or more of the apparatuses 605, 705, and/or 805 described with reference to FIGS. 6, 7, and/or 8. In some examples, a base station and/or apparatus may execute one or more sets of codes to control the functional elements of the base station and/or apparatus to perform the functions described below.

At block 1205, the method 1200 may include performing, by a first base station of a first operator, a downlink CCA for gaining access to an LBT frame of at least one channel of an unlicensed radio frequency spectrum band. By way of example, the LBT frame may have a duration of two milliseconds, five milliseconds, or ten milliseconds. The downlink CCA may be performed during a number of OFDM symbols, which number of OFDM symbols may occur at a beginning of a first subframe of the LBT frame, or at or near an end of a preceding LBT frame. In some examples, the first base station may be the base station 105, 205, and/or 905 described with reference to FIGS. 1, 2, and/or 9, and/or the first base station may include (or be included in) the apparatus 605, 705, and/or 805 described with reference to FIGS. 6, 7, and/or 8. The operation(s) at block 1205 may be performed using the wireless communication management module 620, 720, and/or 820 described with reference to FIGS. 6, 7, and/or 8, the downlink CCA management module 835 described with reference to FIGS. 8, and/or the base station wireless communication management module 960 described with reference to FIG. 9.

At block 1210, the method 1200 may include identifying transmission timings of CETs of a second base station of a second operator and/or transmission timings of uplink CETs of a number of mobile devices communicating with the second base station of the second operator. The second base station of the second operator may be a neighboring base station of the first base station of the first operator. Transmissions of the second base station of the second operator in an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications), and/or transmissions of the number of mobile devices communicating with the second base station of the second operator in the unlicensed radio frequency spectrum band, may be asynchronous to transmissions of the first base station of the first operator in the unlicensed radio frequency spectrum band. The asynchronous transmissions may include, for example, LBT frames, CUBS, downlink subframes, uplink subframes, and/or CETs.

In some examples, identifying the transmission timings of the CETs of the second base station of the second operator may include detecting the transmission timings of the CETs of the second base station of the second operator directly from the second base station of the second operator (e.g., from a CET of the second base station of the second operator). Identifying the transmission timings of the uplink CETs of the number of mobile devices communicating with the second base station of the second operator may include identifying the transmission timings of the CETs of the second base station of the second operator from the CETs of the second base station of the second operator (e.g., by decoding information contained in the CETs of the second base station of the second operator).

The operation(s) at block 1210 may be performed using the wireless communication management module 620, 720, and/or 820 described with reference to FIGS. 6, 7, and/or 8, the CET transmission timing identification module 840 described with reference to FIGS. 8, and/or the base station wireless communication management module 960 described with reference to FIG. 9.

At block 1215, the method 1200 may include discontinuing the transmissions of the first base station of the first operator (e.g., discontinuing transmissions of one or more cells of the first base station of the first operator) during the transmission timings of the CETs of the second base station of the second operator and/or the transmission timings of the uplink CETs of the number of mobile devices communicating with the second base station of the second operator. The one or more cells of the first base station of the first operator may use the unlicensed radio frequency spectrum band. In some examples, the transmissions may be discontinued for one or more LBT frames, subframes, or other transmission increments that overlap the transmission timings of the CETs of the second base station of the second operator and/or the transmission timings of the uplink CETs of the number of mobile devices communicating with the second base station of the second operator.

In some examples of the method 1200, the method 1200 may include discontinuing the transmissions of the first base station of the first operator during 1) the transmission timings of CETs of one or more base stations of one or more operator, and/or 2) the transmission timings of uplink CETs of one or more mobile devices communicating with the second base station of the second operator.

The operation(s) at block 1215 may be performed using the wireless communication management module 620, 720, and/or 820 described with reference to FIGS. 6, 7, and/or 8, the unlicensed RF spectrum access control module 870 described with reference to FIGS. 8, and/or the base station wireless communication management module 960 described with reference to FIG. 9.

At block 1220, the method 1200 may include monitoring, by the first base station of the first operator, for uplink configuration information and downlink configuration information associated with the second base station of the second operator. In some examples, the monitoring may include detecting a CET directly from the second base station of the second operator, wherein the CET includes the uplink configuration information and the downlink configuration information. The CET detected from the second base station of the second operator may include, for example, information relating to a paging channel used by the second base station of the second operator and/or one or more SIBs, from which the uplink configuration information and the downlink configuration information may be obtained or derived. The operation(s) at block 1220 may be performed using the wireless communication management module 620, 720, and/or 820 described with reference to FIGS. 6, 7, and/or 8, the configuration information monitoring module 735 and/or 845 described with reference to FIGS. 7 and/or 8, the CET monitoring module 850 described with reference to FIGS. 8, and/or the base station wireless communication management module 960 described with reference to FIG. 9.

At block 1225, the method 1200 may include identifying a transmission timing of one or more uplink transmissions (e.g., uplink subframes used for uplink transmissions) to the second base station of the second operator based at least in part on the uplink configuration information. The operation(s) at block 1225 may be performed using the wireless communication management module 620, 720, and/or 820 described with reference to FIGS. 6, 7, and/or 8, the uplink transmission timing identification module 740 and/or 865 described with reference to FIGS. 7 and/or 8, and/or the base station wireless communication management module 960 described with reference to FIG. 9.

At block 1230, the method 1200 may include prohibiting access to the unlicensed radio frequency spectrum band by the first base station of the first operator during the identified transmission timing of the one or more uplink transmissions (e.g., uplink subframes). In some examples, this may include bypassing one or more downlink CCAs for gaining access to an LBT frame of at least one channel of the unlicensed radio frequency spectrum band, which CCAs would have been performed during the transmission timing of the one or more uplink transmissions. The at least one channel of the unlicensed radio frequency spectrum band may include at least one channel over which the one or more uplink transmissions used for the uplink transmissions to the second base station of the second operator are transmitted. In this manner, the first base station of the first operator is less likely to interfere with the transmission of the one or more uplink transmissions to the second base station of the second operator. Access to the unlicensed radio frequency spectrum band by the first base station of the first operator may be prohibited despite an energy detection threshold for the unlicensed radio frequency spectrum band (e.g., for one or more channels of the unlicensed radio frequency spectrum band) not being satisfied. The operation(s) at block 1230 may be performed using the wireless communication management module 620, 720, and/or 820 described with reference to FIGS. 6, 7, and/or 8, the unlicensed RF spectrum access control module 745 and/or 870 described with reference to FIGS. 7 and/or 8, and/or the base station wireless communication management module 960 described with reference to FIG. 9.

Thus, the method 1200 may provide for wireless communication. It should be noted that the method 1200 is just one implementation and that the operations of the method 1200 may be rearranged or otherwise modified such that other implementations are possible.

Figure 13:
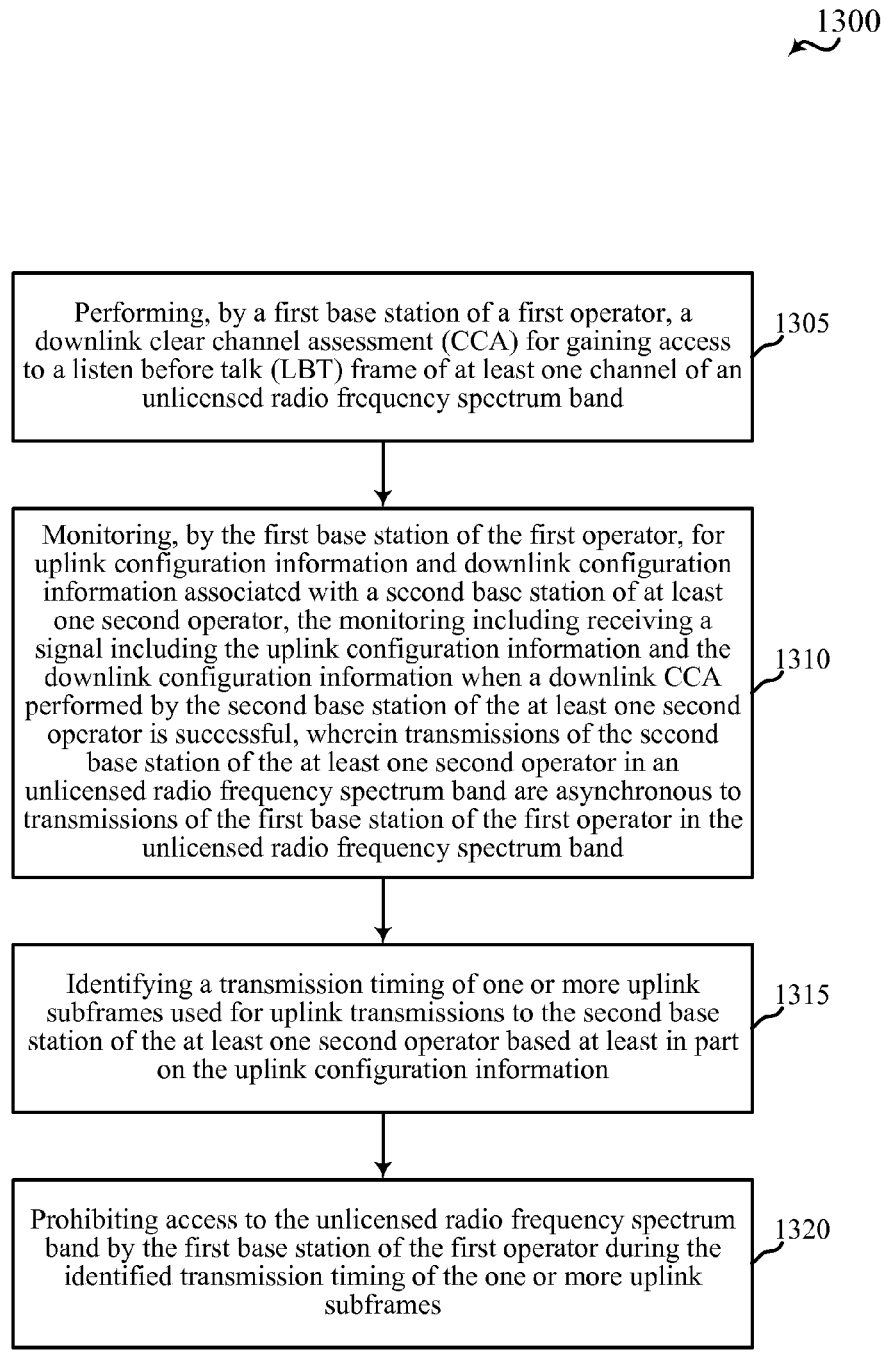
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105, 205, and/or 905 described with reference to FIGS. 1, 2, and/or 9, and/or aspects of one or more of the apparatuses 605, 705, and/or 805 described with reference to FIGS. 6, 7, and/or 8. In some examples, a base station and/or apparatus may execute one or more sets of codes to control the functional elements of the base station and/or apparatus to perform the functions described below.

At block 1305, the method 1300 may include performing, by a first base station of a first operator, a downlink CCA for gaining access to an LBT frame of at least one channel of an unlicensed radio frequency spectrum band. By way of example, the LBT frame may have a duration of two milliseconds, five milliseconds, or ten milliseconds. The downlink CCA may be performed during a number of OFDM symbols, which number of OFDM symbols may occur at a beginning of a first subframe of the LBT frame, or at or near an end of a preceding LBT frame. In some examples, the first base station may be the base station 105, 205, and/or 905 described with reference to FIGS. 1, 2, and/or 9, and/or the first base station may include (or be included in) the apparatus 605, 705, and/or 805 described with reference to FIGS. 6, 7, and/or 8. The operation(s) at block 1305 may be performed using the wireless communication management module 620, 720, and/or 820 described with reference to FIGS. 6, 7, and/or 8, the downlink CCA management module 835 described with reference to FIGS. 8, and/or the base station wireless communication management module 960 described with reference to FIG. 9.

At block 1310, the method 1300 may include monitoring, by the first base station of the first operator, for uplink configuration information and downlink configuration information associated with a second base station of a second operator. The second base station of the second operator may be a neighboring base station of the first base station of the first operator. Transmissions of the second base station of the second operator (including, for example, LBT frames, CUBS, downlink subframes, uplink subframes, and/or CETs) in an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications) may be asynchronous to transmissions of the first base station of the first operator in the unlicensed radio frequency spectrum band.

In some examples, the monitoring at block 1310 may include receiving a signal including the uplink configuration information and the downlink configuration information when a downlink CCA performed by the second base station of the second operator is successful. By way of example, the signal may include a CUBS and/or be embedded in a downlink control region of a frame (e.g., an LBT frame) used for wireless communication.

The operation(s) at block 1310 may be performed using the wireless communication management module 620, 720, and/or 820 described with reference to FIGS. 6, 7, and/or 8, the configuration information monitoring module 735 and/or 845 described with reference to FIGS. 7 and/or 8, the signal monitoring module 855 described with reference to FIGS. 8, and/or the base station wireless communication management module 960 described with reference to FIG. 9.

At block 1315, the method 1300 may include identifying a transmission timing of one or more uplink transmissions (e.g., uplink subframes used for uplink transmissions) to the second base station of the second operator based at least in part on the uplink configuration information. The operation(s) at block 1315 may be performed using the wireless communication management module 620, 720, and/or 820 described with reference to FIGS. 6, 7, and/or 8, the uplink transmission timing identification module 740 and/or 865 described with reference to FIGS. 7 and/or 8, and/or the base station wireless communication management module 960 described with reference to FIG. 9.

At block 1320, the method 1300 may include prohibiting access to the unlicensed radio frequency spectrum band by the first base station of the first operator during the identified transmission timing of the one or more uplink transmissions (e.g., uplink subframes). In some examples, this may include bypassing one or more downlink CCAs for gaining access to an LBT frame of at least one channel of the unlicensed radio frequency spectrum band, which CCAs would have been performed during the transmission timing of the one or more uplink transmissions. The at least one channel of the unlicensed radio frequency spectrum band may include at least one channel over which the one or more uplink transmissions used for the uplink transmissions to the second base station of the second operator are transmitted. In this manner, the first base station of the first operator is less likely to interfere with the transmission of the one or more uplink transmissions to the second base station of the second operator. Access to the unlicensed radio frequency spectrum band by the first base station of the first operator may be prohibited despite an energy detection threshold for the unlicensed radio frequency spectrum band (e.g., for one or more channels of the unlicensed radio frequency spectrum band) not being satisfied. The operation(s) at block 1320 may be performed using the wireless communication management module 620, 720, and/or 820 described with reference to FIGS. 6, 7, and/or 8, the unlicensed RF spectrum access control module 745 and/or 870 described with reference to FIGS. 7 and/or 8, and/or the base station wireless communication management module 960 described with reference to FIG. 9.

Thus, the method 1300 may provide for wireless communication. It should be noted that the method 1300 is just one implementation and that the operations of the method 1300 may be rearranged or otherwise modified such that other implementations are possible.

Figure 14:
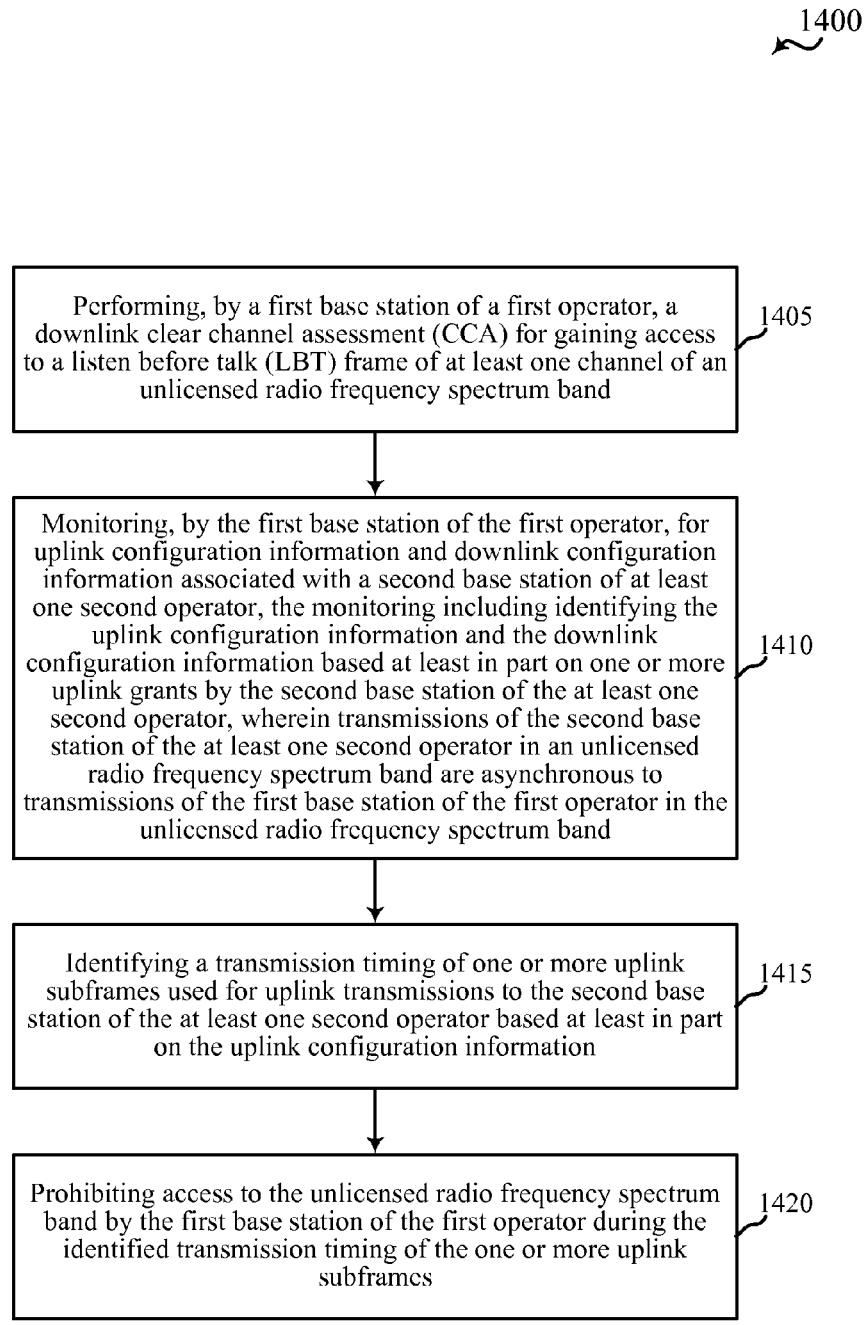
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105, 205, and/or 905 described with reference to FIGS. 1, 2, and/or 9, and/or aspects of one or more of the apparatuses 605, 705, and/or 805 described with reference to FIGS. 6, 7, and/or 8. In some examples, a base station and/or apparatus may execute one or more sets of codes to control the functional elements of the base station and/or apparatus to perform the functions described below.

At block 1405, the method 1400 may include performing, by a first base station of a first operator, a downlink CCA for gaining access to at least one channel of an unlicensed radio frequency spectrum band during an LBT frame. By way of example, the LBT frame may have a duration of two milliseconds, five milliseconds, or ten milliseconds. The downlink CCA may be performed during a number of OFDM symbols, which number of OFDM symbols may occur at a beginning of a first subframe of the LBT frame, or at or near an end of a preceding LBT frame. In some examples, the first base station may be the base station 105, 205, and/or 905 described with reference to FIGS. 1, 2, and/or 9, and/or the first base station may include (or be included in) the apparatus 605, 705, and/or 705 described with reference to FIGS. 6, 7, and/or 8. The operation(s) at block 1405 may be performed using the wireless communication management module 620, 720, and/or 820 described with reference to FIGS. 6, 7, and/or 8, the downlink CCA management module 835 described with reference to FIGS. 8, and/or the base station wireless communication management module 960 described with reference to FIG. 9.

At block 1410, the method 1400 may include monitoring, by the first base station of the first operator, for uplink configuration information and downlink configuration information associated with a second base station of a second operator. The second base station of the second operator may be a neighboring base station of the first base station of the first operator. Transmissions of the second base station of the second operator (including, for example, LBT frames, CUBS, downlink subframes, uplink subframes, and/or CETs) in an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications) may be asynchronous to transmissions of the first base station of the first operator in the unlicensed radio frequency spectrum band.

In some examples, the monitoring at block 1410 may include identifying the uplink configuration information and the downlink configuration information based at least in part on one or more uplink grants by the second base station of the second operator. In some cases, this may include dynamically identifying the transmission timing of the one or more uplink transmissions based at least in part on the uplink configuration information identified from the one or more uplink grants.

The operation(s) at block 1410 may be performed using the wireless communication management module 620, 720, and/or 820 described with reference to FIGS. 6, 7, and/or 8, the configuration information monitoring module 735 and/or 845 described with reference to FIGS. 7 and/or 8, the UL grant monitoring module 860 described with reference to FIGS. 8, and/or the base station wireless communication management module 960 described with reference to FIG. 9.

At block 1415, the method 1400 may include identifying a transmission timing of one or more uplink transmissions (e.g., uplink subframes used for uplink transmissions) to the second base station of the second operator based at least in part on the uplink configuration information. The operation(s) at block 1415 may be performed using the wireless communication management module 620, 720, and/or 820 described with reference to FIGS. 6, 7, and/or 8, the uplink transmission timing identification module 740 and/or 865 described with reference to FIGS. 7 and/or 8, and/or the base station wireless communication management module 960 described with reference to FIG. 9.

At block 1420, the method 1400 may include prohibiting access to the unlicensed radio frequency spectrum band by the first base station of the first operator during the identified transmission timing of the one or more uplink transmissions (e.g., uplink subframes used for uplink transmissions). In some examples, this may include bypassing one or more downlink CCAs for gaining access to an LBT frame of at least one channel of the unlicensed radio frequency spectrum band, which CCAs would have been performed during the transmission timing of the one or more uplink transmissions. The at least one channel of the unlicensed radio frequency spectrum band may include at least one channel over which the one or more uplink transmissions to the second base station of the second operator are transmitted. In this manner, the first base station of the first operator is less likely to interfere with the transmission of the one or more uplink transmissions to the second base station of the second operator. Access to the unlicensed radio frequency spectrum band by the first base station of the first operator may be prohibited despite an energy detection threshold for the unlicensed radio frequency spectrum band (e.g., for one or more channels of the unlicensed radio frequency spectrum band) not being satisfied. The operation(s) at block 1420 may be performed using the wireless communication management module 620, 720, and/or 820 described with reference to FIGS. 6, 7, and/or 8, the unlicensed RF spectrum access control module 745 and/or 870 described with reference to FIGS. 7 and/or 8, and/or the base station wireless communication management module 960 described with reference to FIG. 9.

Thus, the method 1400 may provide for wireless communication. It should be noted that the method 1400 is just one implementation and that the operations of the method 1400 may be rearranged or otherwise modified such that other implementations are possible.

In some examples, one or more aspects of the methods 1100, 1200, 1300, and/or 1400 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
monitoring, by a first base station of a first operator, for uplink configuration information and downlink configuration information associated with a second base station of at least one second operator, wherein transmissions of the second base station of the at least one second operator in an unlicensed radio frequency spectrum band are asynchronous to transmissions of the first base station of the first operator in the unlicensed radio frequency spectrum band;
identifying a transmission timing of one or more uplink transmissions to the second base station of the at least one second operator based at least in part on the uplink configuration information; and
prohibiting access to the unlicensed radio frequency spectrum band by the first base station of the first operator during the transmission timing of the one or more uplink transmissions.

2. The method of claim 1, wherein the monitoring comprises:
monitoring at least a portion of at least one or more slots of a listen before talk (LBT) frame for the uplink configuration information and the downlink configuration information.

3. The method of claim 1, wherein the monitoring comprises:
detecting a clear channel assessment (CCA) exempt transmission (CET) directly from the second base station of the at least one second operator, wherein the CET comprises the uplink configuration information and the downlink configuration information.

4. The method of claim 3, wherein the CET detected from the second base station of the at least one second operator comprises information relating to a paging channel used by the second base station of the at least one second operator.

5. The method of claim 3, wherein the CET detected from the second base station of the at least one second operator comprises one or more system information blocks (SIBs).

6. The method of claim 3, further comprising:
identifying transmission timings of CETs of the second base station of the at least one second operator.

7. The method of claim 6, further comprising:
discontinuing transmissions of the first base station of the first operator during the transmission timings of the CETs of the second base station of the at least one second operator.

8. The method of claim 6, further comprising:
identifying from the CETs of the second base station of the at least one second operator, transmission timings of uplink CETs of a number of mobile devices communicating with the second base station of the at least one second operator.

9. The method of claim 8, further comprising:
discontinuing transmissions of the first base station of the first operator during the transmission timings of the uplink CETs of the number of mobile devices communicating with the second base station of the at least one second operator.

10. The method of claim 1, wherein the monitoring comprises:
receiving a signal comprising the uplink configuration information and the downlink configuration information when a downlink CCA performed by the second base station of the at least one second operator is successful.

11. The method of claim 10, wherein the signal comprises a channel usage beacon signal (CUBS).

12. The method of claim 10, wherein the signal is embedded within a downlink control region of a frame used for wireless communication.

13. The method of claim 1, wherein the monitoring comprises:
identifying the uplink configuration information and the downlink configuration information based at least in part on one or more uplink grants by the second base station of the at least one second operator.

14. The method of claim 13, wherein the identifying the transmission timing of the one or more uplink transmissions comprises:
dynamically identifying the transmission timing of the or more uplink subframes based at least in part on the uplink configuration information identified from the one or more uplink grants.

15. The method of claim 1, wherein the first operator is different from the at least one second operator.

16. An apparatus for wireless communication, comprising:
means for monitoring, by a first base station of a first operator, for uplink configuration information and downlink configuration information associated with a second base station of at least one second operator, wherein transmissions of the second base station of the at least one second operator in an unlicensed radio frequency spectrum band are asynchronous to transmissions of the first base station of the first operator in the unlicensed radio frequency spectrum band;
means for identifying a transmission timing of one or more uplink subframes transmissions to the second base station of the at least one second operator based at least in part on the uplink configuration information; and
means for prohibiting access to the unlicensed radio frequency spectrum band by the first base station of the first operator during the transmission timing of the one or more uplink transmissions.

17. The apparatus of claim 16, wherein the means for monitoring comprises:
means for monitoring at least a portion of at least one or more slots of a listen before talk (LBT) frame for the uplink configuration information and the downlink configuration information.

18. The apparatus of claim 16, wherein the means for monitoring comprises:
means for detecting a clear channel assessment (CCA) exempt transmission (CET) directly from the second base station of the at least one second operator, wherein the CET comprises the uplink configuration information and the downlink configuration information.

19. The apparatus of claim 18, wherein the CET detected from the second base station of the at least one second operator comprises information relating to a paging channel used by the second base station of the at least one second operator.

20. The apparatus of claim 18, wherein the CET detected from the second base station of the at least one second operator comprises one or more system information blocks (SIBs).

21. The apparatus of claim 18, further comprising:
means for identifying transmission timings of CETs of the second base station of the at least one second operator.

22. The apparatus of claim 21, further comprising:
means for discontinuing transmissions of the first base station of the first operator during the transmission timings of the CETs of the second base station of the at least one second operator.

23. The apparatus of claim 21, further comprising:
   means for identifying from the CETs of the second base station of the at least one second operator, transmission timings of uplink CETs of a number of mobile devices communicating with the second base station of the at least one second operator.

24. The apparatus of claim 16, wherein the means for monitoring comprises:
   means for receiving a signal comprising the uplink configuration information and the downlink configuration information when a downlink CCA performed by the second base station of the at least one second operator is successful.

25. The apparatus of claim 16, wherein the means for monitoring comprises:
   means for identifying the uplink configuration information and the downlink configuration information based at least in part on one or more uplink grants by the second base station of the at least one second operator.

26. An apparatus for wireless communication, comprising:
   a processor;
   memory in electronic communication with the processor; and
   instructions stored in the memory, the instructions being executable by the processor to:
   monitor, by a first base station of a first operator, for uplink configuration information and downlink configuration information associated with a second base station of at least one second operator, wherein transmissions of the second base station of the at least one second operator in an unlicensed radio frequency spectrum band are asynchronous to transmissions of the first base station of the first operator in the unlicensed radio frequency spectrum band;
   identify a transmission timing of one or more uplink transmissions to the second base station of the at least one second operator based at least in part on the uplink configuration information; and
   prohibit access to the unlicensed radio frequency spectrum band by the first base station of the first operator during the transmission timing of the one or more uplink transmissions.

27. The apparatus of claim 26, wherein the instructions executable by the processor to monitor comprise instructions executable by the processor to:
   monitor at least a portion of at least one or more slots of a listen before talk (LBT) frame for the uplink configuration information and the downlink configuration information.

28. The apparatus of claim 26, wherein the instructions executable by the processor to monitor comprise instructions executable by the processor to:
   detect a clear channel assessment (CCA) exempt transmission (CET) directly from the second base station of the at least one second operator, wherein the CET comprises the uplink configuration information and the downlink configuration information.

29. A non-transitory computer-readable medium storing computer-executable code for wireless communications, the code executable by a processor to:
   monitor, by a first base station of a first operator, for uplink configuration information and downlink configuration information associated with a second base station of at least one second operator, wherein transmissions of the second base station of the at least one second operator in an unlicensed radio frequency spectrum band are asynchronous to transmissions of the first base station of the first operator in the unlicensed radio frequency spectrum band;
   identify a transmission timing of one or more uplink transmissions to the second base station of the at least one second operator based at least in part on the uplink configuration information; and
   prohibit access to the unlicensed radio frequency spectrum band by the first base station of the first operator during the transmission timing of the one or more uplink transmissions.

30. The non-transitory computer-readable medium of claim 29, wherein the computer-executable code by the processor to monitor comprise computer executable code by the processor to:
   monitor at least a portion of at least one or more slots of a listen before talk (LBT) frame for the uplink configuration information and the downlink configuration information.

* * * * *